US012725191B2

(12) United States Patent
Dotterer et al.

(10) Patent No.: US 12,725,191 B2
(45) Date of Patent: Sep. 1, 2026

(54) KNOWLEDGEBASE WITH WORK PRODUCTS OF SERVICE PROVIDERS AND PROCESSING THEREOF

(71) Applicant: PROZ.COM, Syracuse, NY (US)

(72) Inventors: Henry J. Dotterer, Manlius, NY (US); Kevin S. Dias, Shimotsuke (JP)

(73) Assignee: PROZ.COM, Syracuse, NY (US)

( * ) Notice: Subject to any disclaimer, the term of this patent is extended or adjusted under 35 U.S.C. 154(b) by 661 days.

(21) Appl. No.: 17/199,485

(22) Filed: Mar. 12, 2021

(65) Prior Publication Data

US 2021/0342912 A1 Nov. 4, 2021

Related U.S. Application Data

(63) Continuation of application No. 14/873,881, filed on Oct. 2, 2015, now Pat. No. 10,949,904.

(Continued)

(51) Int. Cl.
*G06F 40/30* (2020.01)
*G06F 16/9535* (2019.01)

(Continued)

(52) U.S. Cl.
CPC ..... *G06Q 30/0625* (2013.01); *G06F 16/9535* (2019.01); *G06F 40/47* (2020.01); *G06Q 10/063112* (2013.01); *G06Q 10/06398* (2013.01); *G06Q 10/10* (2013.01); *G06Q 30/06* (2013.01); *G06Q 30/0609* (2013.01)

(58) Field of Classification Search
CPC .... G06F 40/279; G06F 40/284; G06F 40/295; G06F 40/40; G06F 40/51; G06F 40/44; G06F 40/45; G06F 40/47; G06F 40/58; G06F 40/30; G06Q 10/0611;

(Continued)

(56) References Cited

U.S. PATENT DOCUMENTS 5,608,622 A * 3/1997 Church .................. G06F 40/40 715/236
6,285,978 B1 * 9/2001 Bernth .................. G06F 40/51 704/7

(Continued)

FOREIGN PATENT DOCUMENTS

WO WO2006133571 12/2006
WO WO2009120449 10/2009

(Continued)

OTHER PUBLICATIONS

Roturier, Johann; "Assessing a set of Controlled Language rules: Can they improve the performance of commercial Machine Translation systems"; Proceedings of the International Conference Translating and the Computer; vol. 26; 2004.

(Continued)

*Primary Examiner* — Martin Lerner
(74) *Attorney, Agent, or Firm* — Heslin Rothenberg Farley & Mesiti P.C.; George S. Blasiak, Esq.

(57) ABSTRACT

In one embodiment one or more service provider work product of a knowledgebase can be processed according to one or more methods. A knowledgebase can be provided that includes a work product of one or more service provider. According to one method one or more work product of a knowledgebase can be processed.

20 Claims, 7 Drawing Sheets

Related U.S. Application Data

(60) Provisional application No. 62/059,901, filed on Oct. 4, 2014.

(51) Int. Cl.
*G06F 40/47* (2020.01)
*G06Q 10/0631* (2023.01)
*G06Q 10/0639* (2023.01)
*G06Q 10/10* (2023.01)
*G06Q 30/06* (2023.01)
*G06Q 30/0601* (2023.01)

(58) Field of Classification Search
CPC ..... G06Q 10/06311; G06Q 10/063112; G06Q 30/06; G06Q 30/0609; G06Q 30/0625
USPC ................. 704/1, 2, 7, 9, 30; 705/7.14, 7.38
See application file for complete search history.

(56) References Cited

U.S. PATENT DOCUMENTS 6,574,608 B1 6/2003 Dahod et al.
7,080,117 B2 7/2006 de Pinto et al.
7,110,938 B1 9/2006 Cheng et al.
7,587,307 B2* 9/2009 Cancedda ............... G06F 40/51 704/9
7,904,595 B2 3/2011 Cheng et al.
7,925,494 B2 4/2011 Ciieng et al.
7,983,896 B2 7/2011 Ross
8,108,202 B2 1/2012 Kwon et al.
8,135,575 B1* 3/2012 Dean ....................... G06F 40/58 704/7
8,244,222 B2 8/2012 Sanders
8,326,598 B1* 12/2012 Macherey ............... G06F 40/58 704/4
8,521,506 B2 8/2013 Lancaster et al.
8,756,050 B1 6/2014 Iiarkness et al.
8,849,685 B2 9/2014 Oden
8,935,150 B2 1/2015 Christ
8,990,064 B2 3/2015 Marcu et al.
9,128,929 B2 9/2015 Albat
9,613,003 B1* 4/2017 Goodspeed ............. G06F 40/10
9,860,337 B1* 1/2018 Brown .................... G06F 40/30
10,949,904 B2 3/2021 Dotterer et al.
10,963,848 B1* 3/2021 Anderson .......... G06Q 30/0611
2002/0111787 A1 8/2002 Knyphausen et al.
2002/0120762 A1 8/2002 Cheng et al.
2003/0061570 A1* 3/2003 Hatori ..................... G06F 40/42 715/255
2004/0205671 A1 10/2004 Sukehiro et al.
2007/0043553 A1* 2/2007 Dolan ..................... G06F 40/47 704/2
2007/0150260 A1* 6/2007 Lee ......................... G06F 40/44 704/2
2007/0233460 A1 10/2007 Lancaster et al.
2008/0077395 A1 3/2008 Lancaster et al.
2009/0158137 A1* 6/2009 Ittycheriah .............. G06F 40/51 704/2
2009/0204385 A1 8/2009 Cheng et al.
2009/0248482 A1 10/2009 Knyphausen et al.
2009/0276295 A1 11/2009 Dane
2010/0017254 A1 1/2010 Butler et al.
2010/0023527 A1 1/2010 Kleinsciimidt et al.
2010/0223047 A1 9/2010 Christ
2011/0029300 A1 2/2011 Marcu
2011/0082683 A1 4/2011 Soricut et al.
2011/0082684 A1 4/2011 Soricut et al.
2011/0137730 A1* 6/2011 McCarney ....... G06Q 10/06311 705/14.58
2011/0282647 A1* 11/2011 Pastore ................... G06F 40/58 704/7
2011/0307495 A1 12/2011 Shoshan
2012/0017146 A1 1/2012 Travieso et al.
2012/0130836 A1* 5/2012 Asperi ............... G06Q 30/0601 705/26.1
2012/0221593 A1 8/2012 Trese
2012/0271627 A1* 10/2012 Danielyan ............... G06F 40/30 704/9
2012/0323554 A1 12/2012 Iiopkins et al.
2013/0030790 A1* 1/2013 Yang ....................... G06F 40/51 704/2
2013/0103381 A1 4/2013 Assche
2013/0124185 A1 5/2013 Sarr et al.
2013/0132854 A1 5/2013 Raleigh et al.
2013/0238310 A1 9/2013 Viswanathan
2014/0012565 A1 1/2014 Lancaster et al.
2014/0019114 A1 1/2014 Travieso et al.
2014/0058879 A1 2/2014 Cancedda
2014/0114805 A1* 4/2014 Akolkar ............. G06Q 30/0611 705/26.41
2014/0136443 A1* 5/2014 Kinsey, II .......... G06Q 30/0627 705/347
2014/0142918 A1* 5/2014 Dotterer .................. G06F 40/47 704/2
2014/0195219 A1 7/2014 Sneddon et al.
2014/0236566 A1 8/2014 Schreier
2014/0258013 A1 9/2014 Collins et al.
2014/0258014 A1 9/2014 Collins et al.
2014/0324411 A1 10/2014 Ciienon
2014/0350914 A1* 11/2014 Andrade Silva ........ G06F 40/44 704/2
2015/0019200 A1* 1/2015 Woodward ............. G06F 40/47 704/2
2015/0142415 A1 5/2015 Ciieng et al.
2015/0193850 A1* 7/2015 Tamir ...................... G06F 40/40 705/26.61
2015/0269153 A1* 9/2015 Fink ........................ G06F 40/30 715/254
2015/0278903 A1* 10/2015 Amjadi ............. G06Q 30/0625 705/26.62
2015/0294220 A1* 10/2015 Oreif ........................ G06N 5/04 706/12
2015/0324350 A1* 11/2015 Bufe, III ................. G06F 40/40 704/9
2016/0034450 A1* 2/2016 Chin ....................... G06F 40/51 704/3
2016/0036740 A1* 2/2016 Barber .................... G06F 40/58 704/3
2016/0162969 A1 6/2016 Dotterer et al.
2017/0262528 A1 9/2017 Potok
2025/0029182 A1* 1/2025 Howard ................. G06Q 10/40

FOREIGN PATENT DOCUMENTS

WO WO-2014062941 A1 * 4/2014 ............. G06F 40/47
WO WO2016094096 6/2016

OTHER PUBLICATIONS

Wong, Billy TM et al.; "Extending machine translation evaluation metrics with lexical cohesion to document level." Proceedings of the 212 Joint Conference on Empirical Methods n Natural Language Processing and Computational Natural Language Learning; 2012.
Hardmeier, Christian et al.; "Document-wide decoding for phrase-based statistical machine translation"; Joint Conference on Empirical methods in Natural Language Processing and Computational Natural Language Learning; Jul. 12-14, 2012.
Dotterer et al., International Search Report (ISR) for PCT/U2015053795; filing date Oct. 2, 2015 (PCT Publication No. WO2016/054552); dated Mar. 21, 2016; 2 pages.
Dotterer et al., Written Opinion for PCT/US2015/053795; filing date Oct. 2, 2015 (PCT Publication No. WO2016/054552); dated Mar. 21, 2016; 11 pages.
Krieger, Daniel, "Corpus Linguistics: What It Is and How It Can Be Applied to Teaching", The Internet TESL Journal, Mar. 2023, vol. 9, No. 3, http://iteslj.org/Articles/Krieger-Corpus.html.
Davies, Mark, "The 400 million word Corpus of Historical American English (1810-2009)", English Historical Linguistics 2010,

(56) References Cited

OTHER PUBLICATIONS

Nov. 2012, pp. 231-262, John Benjamins, Amsterdam the Netherlands.
Chen et al., "Developing a Corpus-based Paraphrase Tool to Improve EFL Learner's Writing Skills", Computer Assisted Language Learning, 2013, DOI:10.1080/09588221.2013.783873.

* cited by examiner

Build Your Profile

To appear in the TM- Town directory you need to upload examples of your previous work in order to show your Demonstrated Domain Expertise™. By uploading previous work and getting that work validated or endorsed by others in the field you will improve your TM-Town rank within your area of expertise. The more you can demonstrate your domain expertise (by uploading high quality translation memory units) the higher your rank will be. Higher ranked translators will be featured when clients or translation companies use TM- Town to find translators.

Upload examples of your translation work and your TM-Town profile will be automatically generated for you. You can upload translation memory files, terminology files or sets of parallel documents (e.g. a source document and your translation of that document).If you upload a set of parallel documents TM-Town's free alignment tool will automatically align the documents and create a downloadable translation memory file for you.

Step 1
Upload your translation file(s). Hold the control (PC) or command (Mac) button to select multiple files. Only upload multiple files if they are all in the same field of expertise. Your translation files can be in any of the following formats:

Accepted formats for Translation Memory and terminology files:

- .tmx
- .xliff
- .tbx

Accepted formats for parallel texts:
.pdf|.txt|.doc|.docx.|.xls|.xlsx|.ppt|.pptx|.odt|.ods|.odp|.pages|.key|.numbers|.rtf If you have a translation memory file in another format, send us an email and we will help get your file uploaded and make sure that format is supported going forward.

Choose File No file chosen

TM-Town Upload Policy

Congratulations on deciding to upload your first TM at TM- Town! If you have not yet reviewed the guidelines for uploading material, please do so now.

tl;dr

Do not upload a TM file that you do not have the right to upload

TM- Town will remove any TM files that violate this policy and will suspend or revoke the membership of users who upload such files.

More details --->

Field(s) of Expertise

Step 2
Enter the fields of expertise that your TM file(s) covers.

Field(s) of expertise (e.g. Legal, Family-law):

310

Set the Privacy Settings for the Uploaded TM File(s)

Step 3
Enter the fields of expertise that your TM file(s) covers.
Choose the privacy settings that will cover the uploaded TM file(s)

Share:

- Translation Units And Terms (Recommended)
- Extracted Terms
- Nothing (Your TMs will only be used inside the system for matching and translator discovery)

Share with:

- Anyone (Recommended)
- TM-Town members* (in your language pair and domain)
- TM-Town members you follow*

*Note: the pool of TMs that you can leverage on TM-Town will reflect your share settings

BUILD MY PROFILE

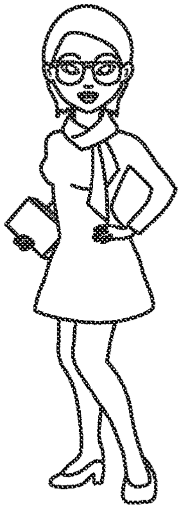

FIG. 3

TM-Town EXPLORE ABOUT SIGNUP SIGNIN

Find Translators

Try out TM-Town's unique Document Search. Upload a document that you need translated and the contents of your document will be analyzed against the previous translation work of all TM-Town experts. You will then be presented with the TM-Town experts whose expertise and domain knowledge best matches the document you are looking to translate.

Choose File No file chosen

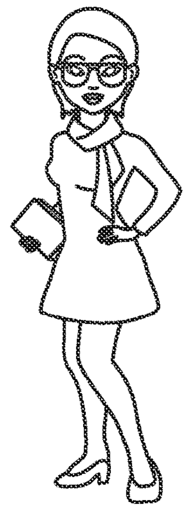

FIG. 4

KNOWLEDGEBASE WITH WORK PRODUCTS OF SERVICE PROVIDERS AND PROCESSING THEREOF

CROSS-REFERENCE TO RELATED APPLICATIONS

This application is a continuation of U.S. application Ser. No. 14/873,881, filed Oct. 2, 2015, titled "Knowledgebase with Work Products of Service Providers and Processing Thereof", which is incorporated by reference herein in its entirety, which claims the benefit of priority of U.S. Provisional Application No. 62/059,901, filed Oct. 4, 2014, titled "Knowledgebase with Work Products of Service Providers and Knowledgebase Enabled Services Marketplace", which is incorporated by reference herein in its entirety. International Patent Application No. PCT/US2015/53795, filed Oct. 2, 2015, titled "Knowledgebase with Work Products of Service Providers and Knowledgebase Enabled Services Marketplace" is incorporated by reference herein in its entirety.

TECHNICAL FIELD

One or more aspects of the present disclosure relate to a knowledgebase, and more particularly to a knowledgebase with work products of service providers and processing thereof.

BACKGROUND

The service sector of the world economy has grown dramatically in importance over the past century, as compared to the industrial and agricultural sectors. It is estimated that commerce in services now accounts for approximately two-thirds of world GDP, and four-fifths of U.S. GDP.

However, trade in services is not necessarily as efficient or as reliable as trade in the other sectors. In particular, service trade suffers from (1) inefficiencies and a lack of reliability relative to the "matching" of service buyers with service providers, and (2) problems that are inherent to the human performance of services even when matches are optimal—namely high cost, limited repeatability, delivery times that may be longer than desired, and the relatively high potential for error.

In recent years a number of Internet-/web-based "marketplaces" or "service exchanges" have appeared, enabling providers and consumers of services to more efficiently meet and carry out service-related transactions. These systems have in many cases proven to be very useful, providing both service providers and service consumers with a better means of meeting transactional counterparts, and carrying out services work, than was previously available.

However significant inefficiencies and drawbacks particular to the approach common to conventional web-based service exchanges remain. For example, web-based services marketplaces in use today tend to rely fundamentally on descriptions provided by service providers as to the services they can offer, their degree of expertise, and so on. For this reason the systems are susceptible to the problem of exaggeration by service providers.

BRIEF DESCRIPTION

In one embodiment one or more service provider work product of a knowledgebase can be processed according to one or more methods. A knowledgebase can be provided that includes a work product of one or more service provider. According to one method one or more work product of a knowledgebase can be processed.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings.

FIG. 3 illustrates an exemplary client computer user interface display screen for use in entering a work product by a service provider;

FIG. 4 illustrates an exemplary client computer user interface display screen for use in entering a source document by a service consumer;

DETAILED DESCRIPTION

Figure 1:
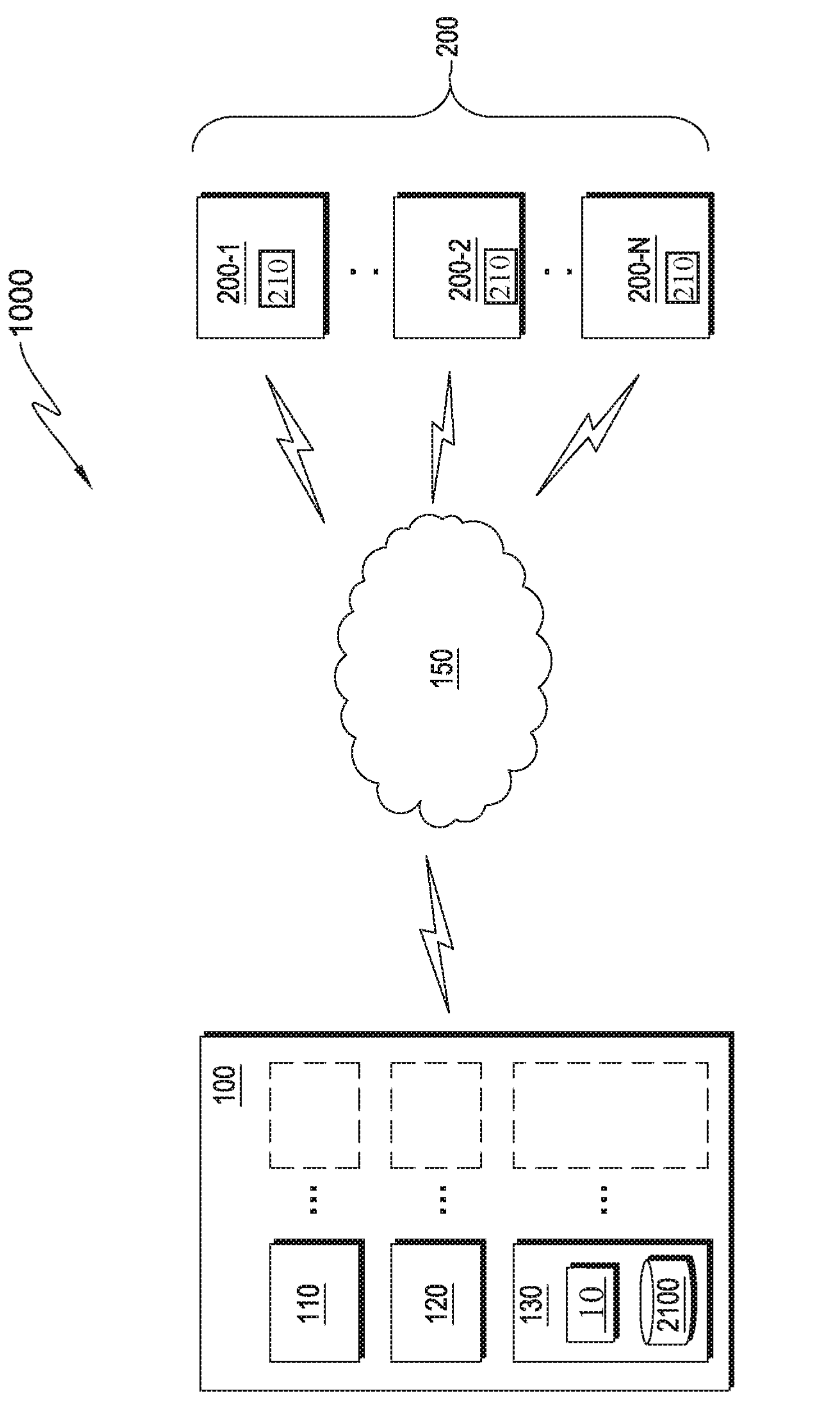
FIG. 1 depicts an exemplary block diagram of a system according to an illustrative embodiment of the disclosure.

Aspects of methods apparatus and systems herein having certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying concepts set forth herein will be apparent to those skilled in the art from this disclosure.

An opportunity and need exists to develop a service enablement system that can incorporate multiple features of web-based service enablement in one platform, with the multiple features interrelating and benefitting from one other. In one example, a system can additionally facilitate and provide incentives for collaboration among service providers, and provide service consumers with an opportunity to compare approaches and efficiently adopt the ones most suitable to their particular needs.

Looking at the state of affairs in the service sector of one embodiment of the present invention—language services—the following problems exist: Matching between language service providers (for example, translators) and their clients remains inefficient, imprecise and unreliable.

There are potential benefits of large-scale sharing of multilingual data, including increased quality efficiency among, for example, translators during the work process, however, no conventional system has provided such benefits, and lack an adequate incentive structure to catalyze such sharing.

Within the scope defined by the technical limitations of automated translation services, such as machine translation, one bottleneck is the lack of corpora and other linguistic assets of the scale necessary to train useful domain-specific engines.

For service consumers, a knowledgebase as described herein can provide a means to discover service providers or otherwise procure human, self-serve or automated services, with a matching algorithm used in service provider selection relying, in one example, at least in part on the contributions or improvements that service providers have made to the knowledgebase and/or service engines.

For service providers, a knowledgebase as described herein can provide a means to connect with service consumers or otherwise obtain service work, to connect with collaborators (and optionally access their services), or to access products or services that assist the service provider in the work process, during for example, a work session, in part by leveraging the information in the knowledgebase.

A services engine component of the system can leverage information in a knowledgebase either to automatically deliver services to service consumers, or to assist human service providers in the performance of their work. The opportunities to benefit from use of a service engine(s), or to receive attribution or other opportunities or benefits from a knowledgebase in connection in a role with one or more service engines, provide incentives for system participants, such as service providers and/or service consumers, to create, train or tune service engine(s), or to enhance the knowledgebase in ways that contribute to the improved performance of the service engine(s).

In addition, actions of service providers, as well as products and by-products of their work, may be captured, thereby further enriching the knowledgebase and/or associated work platform (and optional service engines), and thereby improving the effectiveness of a matching algorithm, in a virtuous cycle.

The computer systems, methods, and computer program products described herein at least in part address the problem of inefficiencies in service by allowing for matching one of many service providers and a service consumer based upon work products of the service providers.

Reference is made below to the drawings, which are not drawn to scale for ease of understanding, wherein the same reference numbers used throughout different figures designate the same or similar components.

Embodiments set forth herein are directed to one or more of updates to, or use of a knowledgebase 2100. FIG. 1 depicts a block diagram of a data communication system 1000 having a server system 100 and a plurality of client computers 200. The plurality of client computers 200 includes a first user computer 200-1 and other user computers 200¬2, 200-N. In one embodiment a first set of a plurality of client computers 200 can be computers used by a provider of a service and second set of the plurality of client computers 200 can be computers used by a consumer of a service.

Client computers 200 can be connected to server system 100 directly or via an intermediate network 150. Network 150 can be provided, for example, by the Internet, an enterprise intranet, a LAN, or a private or a public WAN. In one embodiment, network 150 can carry Internet Protocol (IP) traffic. Client computers 200-1, 200-2, 200-N can be provided by e.g., smart phones, tablet computers, laptop computers and/or personal computers. Client computers 200-1, 200-2, 200-N can include associated user interface 210.

Server system 100 in one embodiment includes one or more processor 110 and one or more memory 120 and one or more computer readable tangible storage device 130 that stores one or more program 10 that can be executed by at least one of the one or more processor 110 for performance of the methods set forth herein. One or more program 10 in one embodiment is stored in at least one of one or more memory 120. In one embodiment, one or more program 10 is one of partially or entirely stored in at least one of one or more memory 120 during execution of one or more program 10 by at least one of one or more processor 110. In one embodiment, one or more program 10 is one or more program running on at least one of one or more processor 110.

In one embodiment, knowledgebase 2100 is stored on at least one of one or more computer readable tangible storage device 130. In one embodiment, knowledgebase 2100 is stored in at least one of one or more memory 120. Knowledgebase 2100 in one embodiment can include content in the form of work product of one or more service providers. In one embodiment knowledgebase 2100 can include content in addition to one or more work product. In one embodiment knowledgebase 2100 can be absent of content other than one or more work product. In one embodiment, one or more processor 110 executes one or more program 10 for performance of a method set forth herein for updating knowledgebase 2100. In one embodiment, one or more processor 110 executes one or more program 10 for performance of a method set forth herein for using knowledgebase 2100. In one embodiment, one or more processor 110 executes one or more program 10 for performance of a method set forth herein for matching service providers and service consumers. In one embodiment, one or more memory 120 includes one or more computer readable RAM and one or more computer readable ROM. In one embodiment, one or more computer readable tangible storage device 130 includes one or more of a magnetic disc storage device and a semiconductor storage device such as a ROM, EPROM or flash memory device. Knowledgebase 2100 can be alternatively termed a database.

An embodiment of an exemplary logic to perform matching between a service provider and a service consumer is described with reference to FIG. 2. In one embodiment the logic of FIG. 2 is performed by one or more program 10 executing on at least one of one or more processor 110 as shown in FIG. 1.

Figure 2:
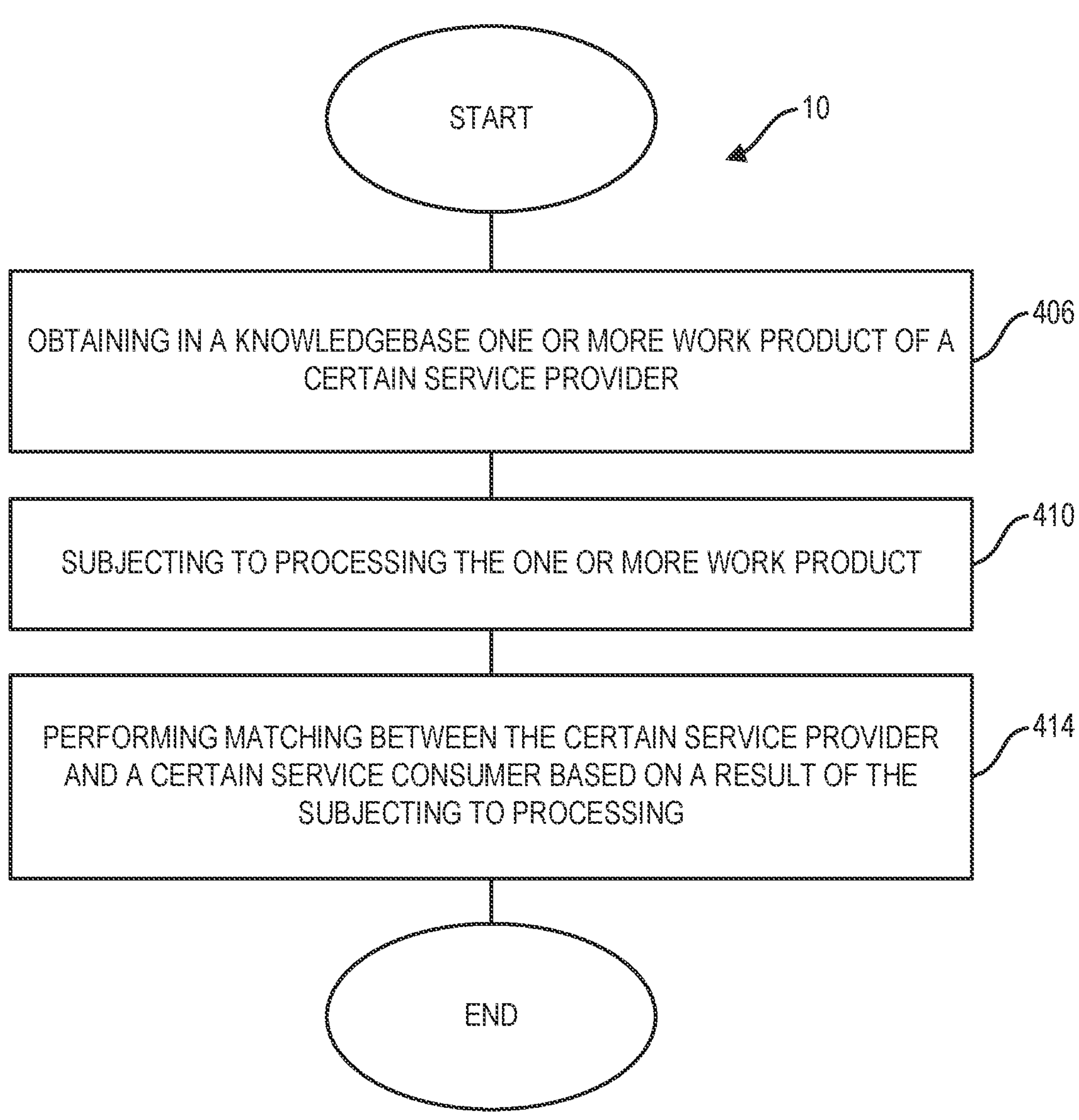
FIG. 2 depicts an exemplary flowchart of a method that is implemented in illustrative embodiments of the disclosure.

With reference to FIG. 2 one or more program 10 at block 406 obtains in knowledgebase 2100 one or more work product of a service provider. At block 410 one or more program 10 processes the one or more work product. At block 414 one or more program 10 performs a matching between a service provider and a service consumer based on a result of the processing performed at block 410. Work product obtained at block 406 can include work product input by a service provider using a user interface 210 of a client computer 200-1, 200-2, 200-N. Work product can be input in form e.g. of field input data (data input into a data input field of a user interface 210) or of a formatted file in an predetermined file format, e.g. .PDF, .TXT, .DOC, .PPT, .XLS. One or more program 10 can serve web pages that define interactive user interface screen displays that can be opened with use of a client browser running on one or more client computer 200¬1, 200-2, 200-N. An example of a user interface screen display of a user interface 210 for use in inputting work product that can be obtained by the one or more program 10 at block 406 is shown in FIG. 3.

In an embodiment, one or more program 10 for performance of block 406 can obtain in knowledgebase 2100 one or more work products using a user interface 210 which as set forth in reference to FIG. 3 can prompt the service provider to enter the one or more work product. In one example, in the field of human translation services, service providers, such as translators, can upload one or more of their work products, such as prior translations, using user interface 210. In such a case, the work products can be uploaded using a variety of methods, including, for example, a graphical user interface to a web based system, or batch uploading of files from a client computer 200-1, 200-2, 200-N to a centralized server system 100. In another example, the work products may be entered into a web display screen or a user interface 210. In other examples, work products can be transferred or shared over cloud-based service, using file transfer protocol (FTP), or other application programming interfaces (API). In further examples, passing of a uniform resource locator (URL) or other resource locator can be used. In one embodiment, one or more program 10 for performance of block 406 can obtain access to a data store storing work products of one or more service provider. In such an embodiment, one or more computer readable tangible storage device storing one or more work product of the one or more service provider can be regarded to be incorporated into one or more computer readable data storage device 130 of system 1000 as shown in FIG. 1.

In an embodiment, one or more program 10 for performance of block 406 can obtain the one or more work products in a specific file format facilitating further processing. In one example, in the field of human language translation, the service provider could be a translator, and the work products initially contributed could be the source and target documents from previous translations. In such a case, work products can be contained in, for example, industry standard file formats such as Translation Memory eXchange (.TMX) or Extensible Markup Language (.XML) Localization Interchange File Format (.XLIFF). In one example, after obtaining work products in knowledgebase 2100, the work products may optionally be analyzed to produce metadata or indexed for storage in knowledgebase 2100. Such an example can allow for optimization of access to knowledgebase 2100. For example, a work product may be obtained in the form of a file system file, which can be indexed and loaded into knowlegebase 2100.

In the view of FIG. 3 the relevant service field is the field of language translation. It will be understood that methods apparatus and systems herein apply to any service field, e.g. photography, architecture, surveying, appraising, law, software development or programming, and writing.

By way of example, service providers and/or service consumers may be individuals (e.g., humans), companies or automated systems that provide or consume services, or that act as intermediaries for other entities that do so. A single entity could act as both a provider and a consumer in the present system.

In one embodiment one or more service provider work product of a knowledgebase can be processed according to one or more methods. According to one method one or more work product of a certain service provider can be subject to processing and matching of the service provider to a service consumer can be performed based on a result of the processing. According to one method, there can be performed processing of one or more service provider work product and assistance can be provided to a certain service provider based on a result of the processing. Apparatus and systems employing described methods are set forth herein.

A work product in one embodiment can be a standard in trade product of work delivered in a relevant service field. Some examples of standard in trade work products include: translated text in the service field of language translation, translated text with associated source text in the service field of language translation, a photograph in the field of photography, a blueprint in the service field of architecture, a survey form in the service field of surveying, an appraisal form in the service field of property appraising, a contract form in the service field of law, a scientific paper in the service field of scientific research (including medical and other scientific research), an audio verse in the service field of advertising, source program code in the service field of software development. A standard in trade work product can be in document form in any of the provided examples.

A work product in one embodiment can include a standard in trade product of work delivered in the relevant service field and in addition can include description by a service provider as to services rendered. For example, referring to FIG. 3 a service provider can enter into data entry field 310 a human authored descriptor of a service provided. In one embodiment, one or more work product of a service provider can include only one or more work product that is a standard in trade product of work delivered in a relevant service field and can be absent any human authored descriptor by a service provider as to services offered.

A knowledgebase 2100 can include one or more work product of one or more service provider. Processing of knowledgebase 2100 performed at block 410 can include performing a series of operations on the one or more work product.

In an embodiment, one or more program 10 for performance of block 410 can subject the knowledgebase 2100 to processing by scoring the service provider. One or more work product at block 410 can be subject to processing for scoring a service provider. For instance, scoring can include contributing peer review, in which one service provider can vet or edit material uploaded by other service providers. One or more work product of a certain service provider can be subject to processing by allowing grading of the work product by the service provider other than the certain service provider, where the grading of the work product contributes to a scoring for the certain service provider.

In one embodiment, processing at block 410 can include processing one or more work product to determine a size of work product content of a certain service provider for scoring a service provider. A score for a certain service provider can be based on size of work product content and can increase with an increasing size of work product content of the certain service provider. Where work products of a service provider are text based, size of work product content of a certain service provider can be based on a cumulative word count of all work products of the certain service provider. A size of work product content of a certain service provider in knowledgebase 2100 can be based in addition or in the alternative on a cumulative file size of work products of a certain service provider obtained in file format.

In one embodiment, processing at block 410 can include processing one or more work product to determine a count of work products of a certain service provider for scoring a service provider. A score for a certain service provider can be based on a count of work products and increase with an increasing work product count of the certain service provider. In the case of language translation services, work products can include, e.g. translated text based documents and glossary terms. One or more program 10 for performance of block 410 can count a number of work products of the knowledgebase 2100 of a certain service provider for scoring the certain service provider. In one specific example, a service provider, such as a translator, can potentially boost scores by contributing new document translations. In one specific example, a service provider, such as a translator, can potentially boost scores for Spanish-to-English/medical translation, by contributing new Spanish medical terms with their English translations to a shared glossary.

In an embodiment, one or more program 10 for performance of block 410 can subject one or more work product of the knowledgebase 2100 to processing for scoring the service provider using peer review to verify the quality of work product of other service providers. A work product can be subject to processing by allowing grading of the work product, where the grading can contribute to a scoring for a service provider. Work products of one service provider could be reviewed, in whole or by sampling, by another service provider. Scoring or peer review can increase confidence scores for quality and/or for field-specific proficiency of service providers.

In one embodiment, scoring of a service provider can include assessing a service provider's reliability as a reviewer. For example, one or more program 10 for performance of block 410 can result in gathering of blind review grades from multiple service providers on multiple work products, and comparing of grades by a certain service provider with majority opinions for each work product. Scoring can include favoring a service provider with reviews consistent with a consensus. Other indicia of reliability can be used, for example, by including certain "red flag" patterns, for example all negative reviews, or all positive reviews but only for a certain service provider, which may be deemed "unreliable", thereby influencing the scoring. For example, scoring may include some or all peer review of work products, and may include other metrics of service providers such as number of obtained work products.

In an embodiment, one or more program 10 for performance of block 410 can subject one or more work product of knowledgebase 2100 to processing by scoring the service provider based on the amount of experience and/or the reliability of the service provider.

For instance, scoring can use the amount of experience that a given service provider has in a given field. This metric can be influenced, in part, by the amount of material that the service provider has contributed. In addition, assume that five prior work products such as translations in the Spanish-to-English/medical, and seven prior work products such as translations in the field of Spanish-to-English/biology, have been obtained from a service provider, such as a translator.

In an embodiment, one or more program 10 for performance of block 410 can subject one or more work product of knowledgebase 2100 to processing by processing one or more work product for scoring the service provider based on experience, quality, and judgment. For instance, experience can include the number and complexity of work products; quality can include peer review; and judgment can include quality of provided peer review. In one specific example, a service provider might have the following performance metrics:

General (all services or domains): Experience: 3, Quality: 4, Judgment: 4

Service 1 (e.g., English-to-Spanish translation): Experience: 4, Quality: 4, Judgment: 4

Service 2 (e.g., English-to-Spanish medical translation): Experience: 3, Quality: 5, Judgment: 5

Service 3 (e.g., English-to-French translation): Experience: 2, Quality: 2, Judgment: n/a In an embodiment, one or more program 10 for performance of block 410 can subject one or more work product knowledgebase 2100 to processing by processing one or more work product for scoring the service provider based on originality. For instance, in the case the service is language translation originality can be scored based on likelihood of plagiarism or likelihood of use of machine translation. For determining whether a work product has been produced using a machine translation, one or more program 10 at block 410 can machine translate a source document (using one or more machine translators) and compare a result to the translation provided by the service provider.

In an embodiment, one or more program 10 for performance of block 406 can obtain in knowledgebase 2100 an additional work product of the service provider, the additional work product being a work product produced for the service consumer identified at matching block 414. For instance, after performing the matching at block 414, the service provider can provide a certain work product to the service consumer, and one or more program 10 for performance of block 406 can update the knowledgebase 2100 with the certain work product. The certain work product can be produced during a work session controlled by one or more program 10. In addition, such a process can be repeated, so that the knowledgebase 2100 continues to grow as service providers produce and/or enter work products that are obtained in knowledgebase 2100.

In an embodiment, one or more program 10 for performance of block 406 can obtain in knowledgebase 2100 a work product by updating the knowledgebase 2100 with work products of one or more service providers other than a certain service provider. For instance, one or more program 10 for performance of block 406 can update knowledgebase 2100 with numerous work products from numerous service providers. In such a case, knowledgebase 2100 can be improved in such a manner to facilitate the matching and scoring processes described above, allowing selection of the best service provider to meet needs of a service consumer.

In an embodiment, one or more program 10 for performance of block 406 can obtain one or more work product in knowledgebase 2100 by updating knowledgebase 2100 with metadata associated with work products. For instance, a translator service provider can be given an opportunity to classify the subject matter of a work product being uploaded by tagging it with keywords or keyword phrases that correspond to one or more fields of expertise (e.g. biology, legal, medical translation).

In an embodiment, one or more program 10 for performance of block 410 can subject the one or more work product to processing by using a text to subject matter processing. For instance, processing can examine the source text in a work product, and determine the frequency of words. The frequency of words can be compared to the frequency of words typically found in various subject matters. As a specific example, a work product may have high frequencies of words such as "football, touchdown, field, goal, down, yardage." Processing can determine that the subject matter of the work product is sports in general, and American football in particular. As another specific example, a work product may have high frequencies of words such as "reboot, battery, click, mouse, keyboard." Processing can determine that the subject matter of the work product is computer technology. As a further example, the frequencies of words in a subject matter can be determined by analyzing known works in different subject matters and comparing to word frequencies of generally non-specific text.

In an embodiment, one or more program 10 can subject the one or more work product to processing at block 410, by using text to subject matter processing on the one or more work product, which may be a text. In an example workflow, user interface 210 can enable uploading of the one or more work product to system 1000, by, for example, a service provider. Thereafter, one or more program 10 for performance of block 410 can subject the one or more work product to lexical analysis processing of the frequency of words in the one or more work product, thereby deriving results of the processing such as the subject matter(s) of the one or more work product, including context, and/or theme. The subject matter(s) of the one or more work product, such as a text, can include who or what the text is about. One or more program 10 can store results of the processing performed at block 410, e.g., determination of the subject matter of the one or more work product, in knowledgebase 2100.

In an embodiment, various techniques can be by used by one or more program 10 to subject the one or more work product to processing to determine the subject matter of a text, including natural language processing, analysis of proper nouns, analysis of noun phrases, etc. Typical text to subject matter processing can include analysis of a corpus, or collection of texts, in which the analysis compares statistics of a text to one or more statistics of the corpus.

For example, one commercially available text analysis system is Salience Engine™ available from Lexalytics, Inc. of Amherst, Massachussetts. Another commercially available text analysis systems include SAS Text Miner available from SAS Institute Inc., of Cary, North Carolina. A further commercially available text analysis system is Semaphore available from Smartlogic of San Jose, California. Using each of the commercially available text analysis systems, a source work product, such as a text can be subjected to processing to determine subject matter. In one example, the commercially available systems described above can be run on server system 100, and one or more program 10 can subject work product files to processing of the commercially available systems.

One or more program 10 for performance of block 410 can perform text processing other than text to subject matter processing. One or more program 10 at block 410 can perform text frequency processing to facilitate similarity determination between text based documents without determination of subject matter. For performance of block 410 in one embodiment, a tool using a bag-of-words Vector Space Model can be utilized. In one embodiment, tool using a bag-of-words Vector Space Model with Term Frequency Inverse Document Frequency (tf*idf) Weights can be utilized. In one embodiment, processing at block 410 can be performed using the RUBY library RUBY VECTOR SPACE MODEL (VSM) with tf*idf WEIGHTS, GSM version 0.1.3. In such embodiment, the default tf*idf formula can follow the Lucene Conceptual Scoring Formula.

In an embodiment, one or more program 10 for performance of block 410 can subject a text based work product to processing for a variety of purposes for different service domains.

In an embodiment, one or more program for performance of block 410 can segment a text based work product document.

In one example, in the service field of translation, one or more program 10 can subject a work product such as a text to processing at block 410 to determine its subject matter, e.g., a Spanish language text about sports.

In another example, in the service field of legal document preparation, one or more program 10 can subject a work product such as a text to processing at block 410 to determine its subject matter, e.g., an employment contract in California.

In a further example, in the service field of education, one or more program 10 can subject work product such as a text to processing at block 410 to determine its subject matter, e.g., a text written by an English as a second language speaker who is a native French speaker.

In an embodiment, where service providers are scored, one or more program 10 for performance of block 414 can identify one or more service providers for performing work for a service consumer based on a highest scoring one or more service providers.

In an embodiment, one or more program 10 for performance of block 414 can identify one or more service provider for performing work for a service consumer based on subject matter of work performed by the service provider.

In an embodiment, one or more program 10 for performance of block 414 can identify one or more service provider based on a scoring of one or more service provider and based on subject matter of work performed by the service provider.

In an embodiment, one or more program 10 for performance of block 414 can generate a list for viewing by a customer of prospective service providers.

In an embodiment, one or more program 10 for performance of block 414 can initiate a work session wherein a certain service provider identified by one or more program 10 performs work for a consumer and wherein one or more aspect of the work session is controlled by one or more program 10.

In an embodiment, one or more program 10 for performance of block 414 can perform matching by selecting service providers for a given service need of a service consumer based upon comparing profile information of a service consumer with profile information of service providers, the profile information of service providers having been determined from the knowledgebase including work products obtained from the service providers.

In an embodiment, one or more program 10 for performance of block 414 can perform matching by processing a service order of a service consumer and responsively inviting a matched service provider to accept work of the service consumer.

In an embodiment, one or more program 10 for performance of block 414 can perform matching by selecting a service provider with work products associated with content similar to content in a work order of a service consumer.

In an embodiment, one or more program 10 for performance of block 414 can perform matching by, in response to an indication of a service subject matter need of a service consumer, finding a set of one or more service providers with work products having subject matter similar to the service need of the service consumer, and providing the service consumer with indicators of the one or more service providers.

In an embodiment, one or more program 10 at block 414 can examine a human authored descriptor input by a service consumer using a user interface 210 of client computer 200-1, 200-2, 200-N for determining a subject matter need of a service consumer. A data input field of a user interface of client computer 200-1, 200-2, 200-N can allow a service consumer to enter a human authored descriptor of a subject matter or other criteria of a work request, which descriptor can be obtained by one or more program 10 and used during performance of matching block 414.

In an embodiment, one or more program 10 at block 414 can obtain and examine a text based document (e.g. source document in the service field of language translation or other text based document in another service field) input by a service consumer using a user interface 210 of a client computer 200-1, 200-2, 200-N for determining a subject matter need of a service consumer. In one embodiment, such source document can be formatted file in an predetermined file format, e.g. .PDF, .TXT, .DOC, .PPT, .XLS. In one embodiment, a matching performed by one or more program 10 at block 414 can be absent an obtaining of a human authored descriptor of a subject matter or other criteria of a work request. In such embodiment, one or more program 10 can determine work request criteria solely by processing one or more source document of a service consumer.

In one embodiment, one or more program 10 for performance of block 414 can obtain the text based document of a service consumer and can examine the document using text based processing. For example, one or more program 10 may include a user interface 210 capable of sending a message to a service consumer requesting presentment of text based document by a service consumer. In the case of language translation services the text based document can be a source document to be translated. In one embodiment, in the performance of block 414 one or more program 410 can examine a text based document by performing text based processing of a text based document. In one embodiment, one or more program 10 for performance of block 414 can examine a text based document of a service consumer using text to subject matter processing as set forth herein for determining a subject matter of a text based document, and can identify a matching one or more service provider based on the one or more service provider having a best fit work product content to the determined subject matter. In one embodiment, one or more program 10 for performance of block 414 can examine an obtained text based document of a service consumer using term frequency processing as set forth herein for determining a frequency of terms of a text based document, and can identify a matching one or more service provider based on the one or more service provider having a best fit work product content to the determined frequency of terms.

In one embodiment, one or more program 10 for performance of block 414 can examine an obtained text based document of a service customer using segmentation processing and can identify a matching one or more service provider based on matched or partially matched (e.g., fuzzy matched) segments in work products of knowledgebase 2100. Translation memory processing as set forth herein can be utilized in the performance of matching using segmentation processing.

It will be seen that text based processing as set forth herein can be useful in the performance of processing at block 410 and/or matching at block 414 in any service field where work products can be provided by text based work products, e.g. the service fields of language translation, architecture, surveying, appraising, law and scientific research.

In the case of a service field in which a work product can be visual (e.g. photography) a processing at block 410 and/or a matching at block 414 can be performed using content based image retrieval (CBIR). In one example CBIR can include use of the GNU Image Finding Tool (GIFT) available from GNU. Where a work product can be visual one or more work program 10 at block 414 can obtain an image sample of a service customer, e.g. in an image file format, e.g. .GIF, .JPG, .PNG. The obtaining can be through a web based user interface.

In the case of a service field in which a work product can be aural (e.g. advertising) a processing at block 410 and/or a matching at block 414 can be performed using e.g. audio fingerprinting processing. In one example audio fingerprinting can include use of the AcoustID software library available from MusicBrainz' of California. Where a work product can be audio one or program 10 at block 414 can obtain an audio sample of a service consumer, e.g. in an audio file format, e.g. .WAV, .MP3, .OGG. The obtaining can be through a web based user interface.

One or more program for performance of block 414 can provide using a graphical user interface a service consumer with listings of sets of one or more service providers, using various textual and graphical representations that suitably match, given the degree of similarity of the service request to the work products of the service provider. An exemplary display screen of a user interface 210 of a client computer 200¬1, 200-2, 200-N for use in uploading a source document is illustrated in FIG. 4.

In an embodiment, one or more program 10 for performance of block 414 can perform matching by using a natural language processing (NLP) technique such as term frequency/inverse domain frequency, whereby terms that appear in unusually high frequencies in each document (as compared to the general collection of documents) are compared to gauge similarity of subject matter.

In an embodiment, one or more program 10 for performance of block 414 performing matching can include processing a work request file of the service consumer.

In an embodiment, one or more program 10 for performance of block 414 performing matching can include messaging one or more of a service provider or service consumer to present options.

In an embodiment, one or more program 10 for performance of block 414 performing matching can include generating the result of the processing to match the service order of the service consumer.

In an embodiment, one or more program 10 for performance of block 414 performing matching can include generating the result of the processing to match the service order of the service consumer.

Figure 5:
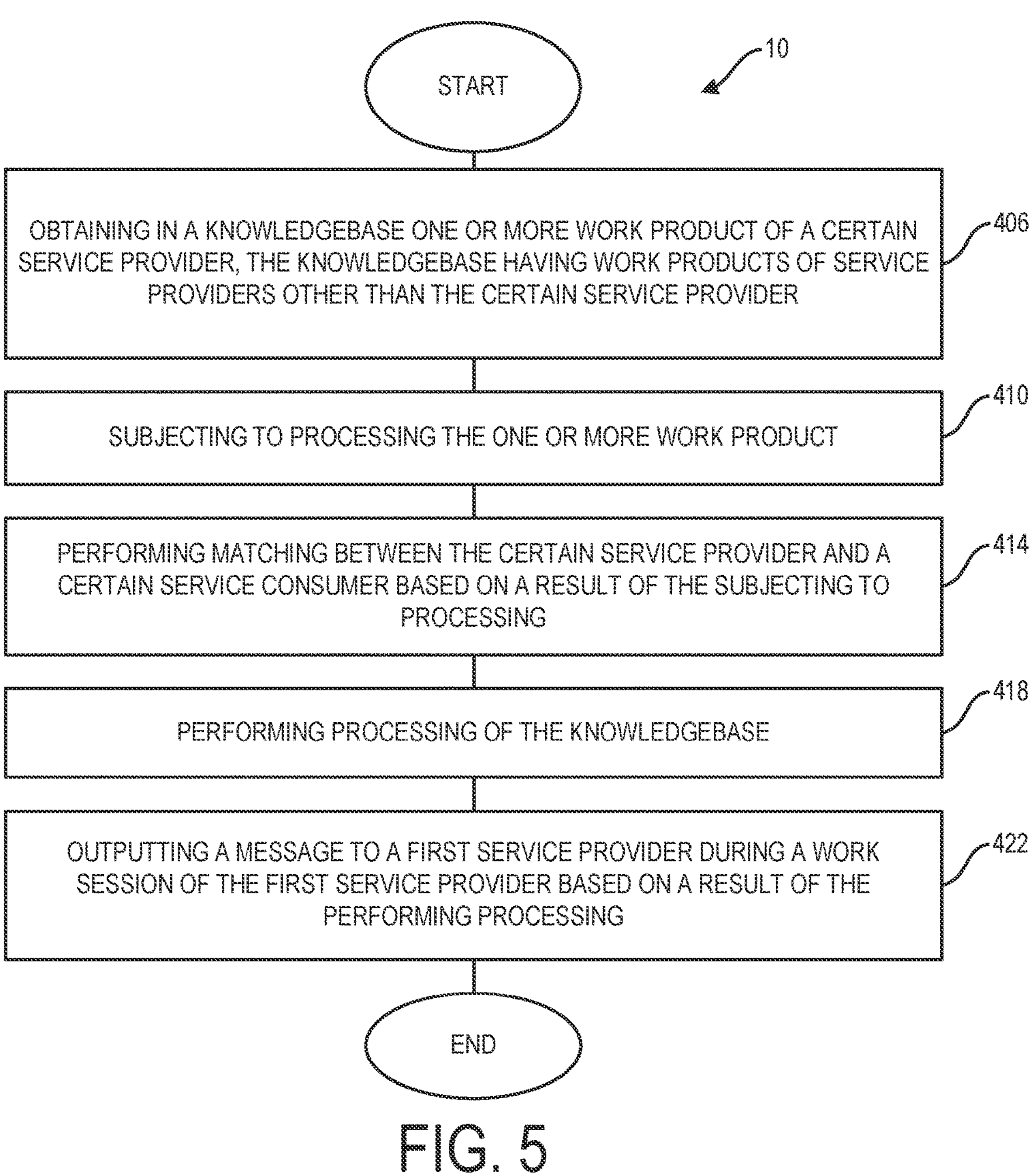
FIG. 5 depicts an exemplary flowchart of a method that is implemented in illustrative embodiments of the disclosure.

An enhanced embodiment of the logic depicted in FIG. 2 is provided in FIG. 5. In the embodiment of FIG. 5 data of knowledgebase 2100 having work product of one or more service provider can be processed for matching a certain service provider to a certain service consumer and can also be processed for assisting of the certain service provider in the performance of work.

With reference to FIG. 5 one or more program 10 at block 406 obtains in knowledgebase 2100 one or more work product of a certain service provider, wherein the knowledgebase 2100 includes work products of service providers other than the certain service provider. At block 410 one or more program 10 subjects the knowledgebase 2100 to processing. At block 414 one or more program 10 performs matching between the service provider and a service consumer based on a result of the processing performed at block 410. At block 418 one or more program 10 performs processing on data of knowledgebase 2100. At block 422 one or more program 10 provides assistance to a first service provider during a work session of the first service provider based on a result of the processing at block 418. One or more program 10 can perform block 406 410 and 414 in the manner set forth in reference to the flow diagram of FIG. 2.

In one example, the first service provider referenced at block 422 is the certain service provider referenced at block 406. In such example, a service provider receiving a message at block 422 can be a service provider for which a work product is obtained at block 406. In another example, the first service provider is a service provider other than the certain service provider. In such example, the first service provider may be a service for which there is no work product in knowledgebase 2100. The first service provider in such example may be a service provider receiving a message at block 422 who may not contribute any work product to knowledgebase 2100 and who may benefit from work products of service providers other than the first service provider being obtained in knowledgebase 2100.

One or more program 10 for performance of block 418 in one embodiment can examine work products of one or more service provider. One or more program 10 for performance of block 418 can examine work products of a plurality of service providers.

In an embodiment, one or more program 10 for performance of block 418 can perform a processing having processing quality (e.g. in terms of accuracy and size of returned data) that increases with an increase in size of work product content included in knowledgebase 2100. In the service field of language translations, a processing performed at block 418 can include translation memory (TM) processing using a translation memory (TM) tool. A translation memory, or TM, is a database that stores "segments", which can be sentences, paragraphs or sentence-like units (headings, titles or elements in a list) that have previously been translated, in order to aid human translators. The translation memory stores the source text and its corresponding translation in language pairs called "translation units". Translation memories are typically used in conjunction with a dedicated computer assisted translation (CAT) tool, word processing program, terminology management systems, multilingual dictionary, or even raw machine translation output. Processing quality, e.g. in terms of accuracy, error tolerance, size of returned data, of translation memory (TM) processing can increase with an increase in size of work product content included in knowledgebase 2100. In another example, such as legal services, for instance contract drafting, an increased in size in work product content, such as for example legal clauses for specific situations, can increase a processing quality.

In an embodiment, one or more program 10 for performance of block 422 can output a message to the service provider during a work session of the service provider based on a result of the processing of knowledgebase 2100 at block 410. By way of example, a work session can include the service consumer and service provider agreeing or contracting that the service provider will perform the service request for a specific compensation. The work session can include the service provider performing the work, e.g., translating a source text from a source language to a target language to create a new work product. In one embodiment, one or more program 10 can control a work session. One or more program 10 can control a work session by controlling one or more aspect of a work session. For example, one or more program 10 can cause display on a service provider client computer 200-1, 200-2, 200-N of a certain display entry screen of a user interface 210 for facilitating the performance of work by a service provider. For example, as illustrated in reference to the client computer user interface 210 of FIG. 6 one or more program 10 can cause display of certain data input area 606 for input of work product data.

Figure 6:
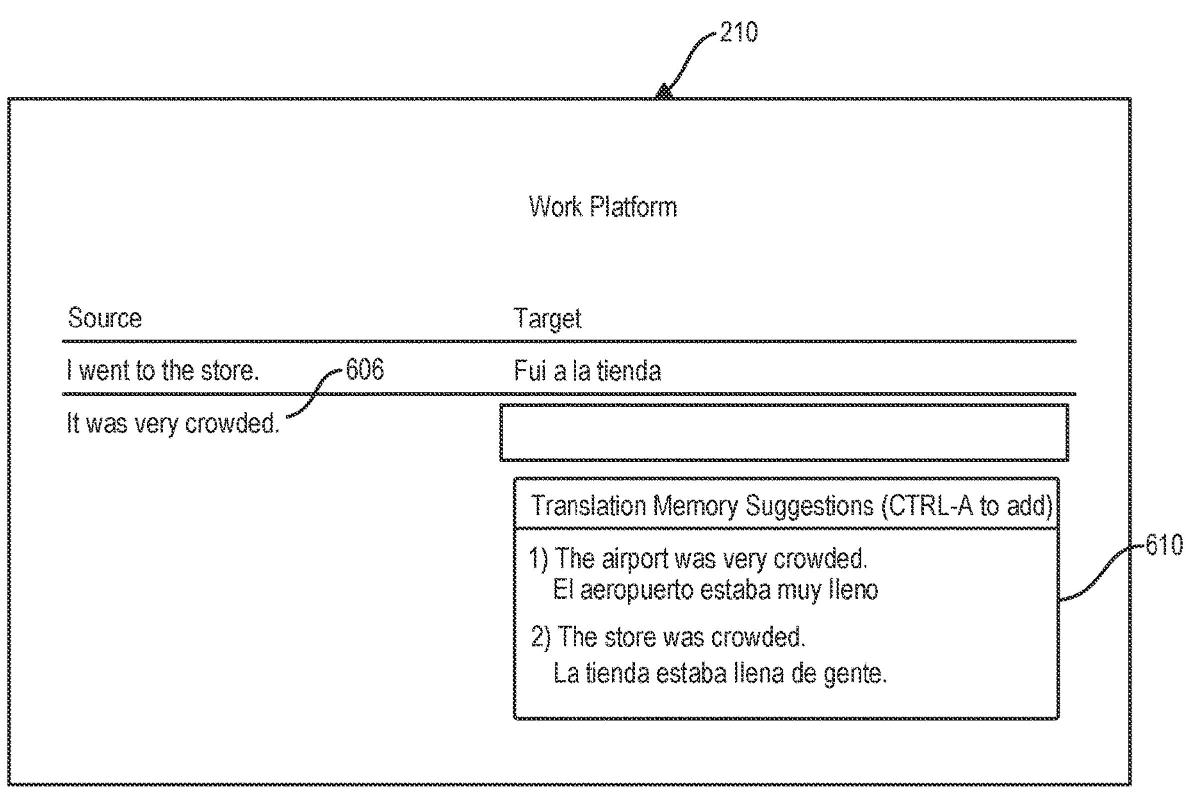
FIG. 6 is an exemplary client computer user interface display screen illustrating a service provider being assisted during performance of work.

In one example of one or more program 10 controlling a work session, one or more program 10 can provide a web site hosted by server system 100 that can serve web pages to client computers 200-1, 200-2, 200-N having screen displays defining user interface 210 for two or more of (a) entry of a work product as illustrated in FIG. 3 and (b) providing of a data input area 606 for input of work product data and illustrated in FIG. 6 and for (c) outputting messages e.g. display messages at area 610 for assisting a service provider in the performance of work.

Referring further to block 422, one or more program 10 for performance of block 422 in the case of language translation services can output suggested translations (e.g., of sentences) to aid the service provider in translating. An output area 610 for displaying messages is illustrated in reference to the client computer user interface 210 of FIG. 6. In the example of FIG. 6, the output message includes a visual component. In another embodiment, an output message can include in addition or in the alternative an audio component or a tactile component. In reference to block 422, the techniques disclosed herein allow knowledgebase 2100 to be used for assisting producing work product by the service provider. In addition, the work session can correspond to the matching between the service provider and the service consumer. In such a case, the work session can be a work session for the purpose, at least in part, of the service provider in the case of language translation translating a source provided by the matched service consumer.

In an embodiment, one or more program 10 outputting a message in the performance of block 422 to a service provider during a work session can include augmenting and assisting the service provider in performing the service by outputting in the message to the service provider a result of processing the knowledgebase.

In one example, in the service field of translation, one or more program 10 can output a message to the service provider at block 422 with results of processing the knowledgebase to compare text to be translated with previously translated sentences, and the message to the service provider can include one or more potential translated sentences for the text to be translated derived from processing of the knowledgebase. Such tools are commonly referred to as translation memory tools.

In another example, in the field of language translation, one or more program 10 can output a message to the service provider at block 422 during an online web-based work session in which the outputted message includes a proposed translation of one sentence at a time obtained from processing the knowledgebase. In a further example, one or more program 10 can output another message to the service provider at block 422 during a work session of the service provider in which the outputted message includes a set of translation information from the knowledgebase relevant to an entire source text uploaded by the service provider using a graphical interface 210, and the service provider can use the outputted message in conjunction with one or more commercially available translation tools during the work session.

For example, one commercially available translation tool is SDL Trados Studio, available from SDL PLC, Maidenhead, United Kingdom. In such a tool, information such as previous translations of texts and sentences, can be loaded to facilitate translation of a new text. For example, a new text can be loaded, and the tool can search its internal database for similar sentences, which can be suggested as translations. In the example given above, a set of information, e.g., work products, from the knowledgebase 2100 can be provided to the service provider for use with the tool, in an automated manner. Accordingly, one or more program 10 in the performance of block 418 can implement the tool to examine work products of knowledgebase 2100 of a plurality of service providers to identify sentences similar to those being typed by a service provider. Then, for this specific work session, the one or more program 10 employing the tool can make use of the provided knowledgebase information to assist the service provider in performing the work to create the work product.

It has been described that in the field of language translation services one or more program 10 in the performance of block 418 can perform processing using a translation memory tool. Such tools work by identifying patterns in sentence structure and outputting portions of stored patterns having similar sentence structure. Translation memory tools and other text pattern search and return tools generally benefit when a sample size of a database is increased.

Similar text pattern search and return tools can be used to assist a service provider in the performance of work in fields other than language translation. Text pattern search and return tools can benefit from increases in sample sizes because of the increased amount of data to associate with given patterns.

In one example, a web based tool Corpora is available from Brigham Young University, Provo, Utah. See Davies, Mark. (2008-) The Corpus of Contemporary American English: 450 million words, 1990-present. Corpora is able to determine not just the frequency of words, but the frequency of an N-gram, which is an N word phrase. In addition, specific types of phrases can be analyzed, such as noun+noun, verb+noun, noun+verb, verb+adverb, in order to provide further detailed information. Further, collocation of words can be analyzed, indicating the frequency with which a first word is located nearby (e.g., a specified number of words from) a second word. In such a tool, the size of the corpus increases the ability to provide information to assist a service provider—corpus size is very important.

In an example, in the service field of law, one or more program 10 can output a message to the service provider at block 422 with multiple examples of non-compete clauses used specifically in employment agreements having their jurisdiction as the State of Colorado.

In another example, in the field of software development or programming, one or more program 10 can output a message to the service provider at block 422 with multiple examples of source code for implementing a specific function or method.

In an example, an automatic paraphrasing suggesting system known as PREFER is available from National Tsing Hua University, Hsin Chu, Taiwan. For instance, in the field of writing, those who speak English as a foreign language can make use of such system 1000, because paraphrasing using different words is important in writing. English as a foreign language (EFL) learners can have difficulty with paraphrasing. PREFER, is an online corpus-based paraphrasing assistance system that allows multi-word input and returns a list of paraphrases in English and Chinese, and usage patterns and example sentences. See for example: Developing a Corpus-based Paraphrase Tool to Improve EFL Learners' Writing Skills, Mei-Hua Chen, Shih-Ting Huang, Jason S. Chang, Hsien-Chin Liou, Computer Assisted Language Learning (January 2013). In an example, in the field of EFL learning, one or more program 10 for performance of block 418 can implement functionality of PREFER. In such a case, one or more program 10 can output a message to the service provider at block 422 with multiple alternate paraphrases.

In language teaching, the use of systems with a corpus has been found to be beneficial. For example: "The development of materials often relies on a developer's intuitive sense of what students need to learn. With the help of a corpus, a materials developer could create exercises based on real examples which provide students with an opportunity to discover features of language use. In this scenario, the materials developer could conduct the analysis or simply use a published corpus study as a reference guide." See Corpus Linguistics: What It Is and How It Can Be Applied to Teaching, Daniel Krieger, Siebold University of Nagasaki (Nagasaki, Japan).

In an example, one or more program 10 can output a message to the service provider at block 422 with responses to exercises for a language student. For instance, a language student can work with the service provider, and provide a response to an exercise, and one or more program 10 can output a message to the service provider with alternate responses for the exercise to use in educating the student.

In an example, in the service field of software development or programming, the techniques disclosed herein allow one or more program 10 for performance of block 422 to suggest different source code examples to implement a specific function.

In an example, in the service field of writing English for those who speak English as a second language, the techniques disclosed herein allow one or more program 10 for performance of block 422 to suggest different ways of phrasing an input sentence that may be more appropriate, or have better use of idioms or jargon.

In an example, in the service field of teaching, the techniques disclosed herein allow one or more program 10 for performance of block 422 to create exercises for a student to enter a response, and the system to provide different or better possible responses.

With use of translation memory tools (which can be employed for performance of block 418 in language translation service field application) and other text pattern search and return tools (useful for performance of block 418 in service applications other than language translation service application fields characterized by text based work products) processing quality can increase with an increased size of work product content in knowledgebase 2100. In one aspect processing quality can increase by way of increased accuracy. For example, processing at block 418 can include a feature wherein system 1000 is restricted from outputting a help message at block 422 unless a text pattern matching to currently authored text pattern occurs more than N times in knowledgebase 2100, thereby limiting help messages to those determined to have achieved "consensus" stature. In one aspect processing quality can increase by way of improved error tolerance. For example, with an increased size of work product data, there is an increased likelihood of returned hits even with misspelled words. In one aspect processing quality can increase by way of increased size of return data. For example, the larger the work product content of knowledgebase 2100, a return count of matches ("hits") can be expected to be returned. A size of work product content of knowledgebase 2100 can result in increased processing quality for processing performed at block 410, e.g. by facilitating increased accuracy for performing of matching at block 414, increased error tolerance for performing of matching at block 414 and increased size of returned data (e.g. increased number of hits) for performing matching at block 414. Processing quality, in terms of accuracy, error tolerance and returned data size, can be improved with increasing size of work product content in the case of visual or audio based work products.

In the case of language translation services, one or more program 10 in the performance of block 418 (for use in the determination of a message output at block 422) can use Machine Translation (MT) tools. Such tools use statistical models having parameters derived from the analysis of bilingual text corpora. A quality processing of Machine Translation tools generally improves with increased sample size of a corpus. In one example, a Machine Translation took can be provided by the open source tool MOSES.

In another aspect in an embodiment, one or more program 10 for performance of block 410 can grade a work product that is produced by a service provider during a work session controlled by one or more program 10. A work session controlled by one or more program 10 can include one or more aspect controlled by one or more program 10. Where one or more program 10 controls an aspect of a work session, one or more program 10 can facilitate additional options for grading a work product, which grading can be used for scoring a service provider. Work products that are produced during a work session controlled by one or more program 10 can have grading attributes that are not included in work products produced during a work session controlled by one or more program 10, which may be termed batch work products. In one aspect, knowledgebase 2100 can include one or more batch work product and one or more controlled work session work product. In one embodiment, a batch work product can be a work product produced during a work session not controlled by one or more program 10. A batch work product in one embodiment can be a work product that is produced without assistance provided by outputting a message at block 422 during a work session and which is produced without monitoring of work session for production of a work product, e.g. for grading a work product for scoring a service provider. In one embodiment a controlled work session work product can be a work product produced during a work session controlled by one or more program 10. A controlled work session work product in one embodiment can be a work product produced during a work session wherein assistance is provided to a service provider at block 422 or where there is a monitoring of work session for producing a work product. In one embodiment a monitoring can include elapsed time monitoring. In one embodiment, a monitoring can include processing work product content as it is produced prior to completion of completed work product document. In one embodiment, a monitoring can include user interface monitoring for monitoring user interface actions of a service provider, e.g. for determining whether a service provider has changed a data input in the providing of a work product. A controlled work session work product in one embodiment can be a work product that is one or more produced with assistance provided by outputting a message at block 422 during a work session or which is produced during a work session that is subject to monitoring by one or more program 10, e.g. for grading the one or more product for scoring of a service provider.

There is set forth herein a method wherein the one or more work product of a certain service provider includes one or more batch work product and one or more controlled work session work product and wherein the subjecting to processing the one or more work product at block 410 of the certain service provider includes processing the one or more work product for scoring the certain service provider by applying a different algorithm to grade the one or more work product depending on whether the work product is a batch work product or a controlled work session work product.

One or more program 10 can grade a work product produced during a work session controlled by one or more program 10 based on elapsed time for completion (using an internal clock of server system 100 for example) and can also score a work product based on accuracy for example (e.g. based on how many times a content has been changed until a correct content has been achieved by a service provider). A work session can be mediated by way of one or more program 10 including a web based server application with access to knowledgebase 2100. In such an example, a service provider can perform a service using the web based server application, e.g. as illustrated in FIG. 6 which can use knowledgebase 2100 to assist the service provider in performing work, by providing sample results to the service provider. In one specific example, as shown in FIG. 6 in the case the service field is language translation a service provider can enter in field 606 a sentence to be translated, and the web based server application can output a message at area 610 a suggested translation of the sentence to the service provider, the suggested translation having been derived from knowledgebase 2100. In another specific example, a service provider can enter a description of a software function to be programmed, and the web based server application can output suggested source code for the function to the service provider, the suggested source code having been derived from knowledgebase 2100.

On completion of a certain work product produced during a work session controlled by one or more program 10, e.g. as illustrated in reference to FIG. 6, one or more program 10 can update knowledgebase 2100 to include the certain work product. In such an embodiment, knowledgebase 2100 can include both batch work products as set forth herein and controlled work session work products, which in one embodiment are work products produced during a work session controlled by one or more program 10. Work products of a certain service provider in knowledgebase 2100 can include one or more batch work product and one or more controlled work session work product. In the performance of block 410 in one embodiment, one or more program 10 can select a scoring algorithm to be used for scoring a certain service provider based on whether knowledgebase 2100 includes for the certain service provider any batch work products. In performing a scoring of a certain service provider one or more program 10 at block 410 can attribute greater weight to grades determined for controlled work session work products than batch work products In one embodiment, work session controlled work products can be regarded to have a more reliable certification of originality.

One or more program 10 at block 418 can employ processing having processing quality that increases with an increased size of work product content in knowledgebase 2100. One or more program 10 can include various features that operate to increase a size of work product content in knowledgebase 2100. System 1000 can be configured so that work product content of knowledgebase 2100 grows on a de facto basis with minimal or no effort on the part of a human administrator of knowledgebase 2100. For example, system 1000 can be configured so that work product content of knowledgebase can grow without batch uploading of work product content to knowledgebase 2100 by an administrator (though content can be supplemented with batch uploads by an administrator).

According to a feature for increasing a size of work product content in knowledgebase 2100, one or more program 10 can offer matching of service providers to service consumers. Accordingly, service providers can be incentivized to present additional work products for inclusion in knowledgebase 2100 for purposes of achieving matches with service consumers. In another aspect, one or more program 10 can incentive addition of work products by initiating a work session for supporting production of a controlled work session work product responsively to a matching being performed at block 414. For example, responsively to performing matching at block 414, one or more program 10 can initiate a work session featured by work session support display screen user interface 210 as illustrated in FIG. 6. In another aspect, one or more program 10 can further growth of work product content in knowledgebase 2100 by way of public display of work product content of knowledgebase 2100. Such display can result in locating of a website serving web pages in support of system 1000 by a search engine and can increase views of the web pages of the website, and therefore further increase uploads of work product content into knowledgebase 2100.

In one aspect, the capacity of system 1000 to connect service providers to service consumers can act as an attractant to attract service providers to view web pages that can be served by one or more program 10. Because service providers can be matched to service consumers by providing work products for obtaining by one or more program 10, one or more program 10 can incentivize service providers to provide more and more work products for obtaining by one or more program 10 for inclusion in knowledgebase 2100. In one embodiment one or more program 10 at block 410 can grade a work product in a manner that an overall score for a service provider can only increase and cannot decrease by adding additional work products for inclusion in knowledgebase 2100. In such manner, one or more program 10 can optimally incentivize providing of additional work products for inclusion in knowledgebase 2100.

Because one or more program 10 can assist a service provider in performance of work with use of processing having a processing quality that increases with an increase in size of work product content, a result of the including of additional work products in knowledgebase 2100 can be that a quality of work that is produced using system 1000 can be increased.

In another aspect of processing that can be performed on one or more work product, one or more program 10 can publicly display work products of knowledgebase 2100 entered by service providers and included within web pages that can be served by one or more program 10 via e.g. server system 100. By public display of work products of knowledgebase 2100, queries entered into web content search engines, e.g., GOOGLE, can yield the displayed work products, increasing views of web pages that can be served by one or more program 10. In such an example, security features may be included so that public display of work products of knowledgebase 2100 can be limited depending on preferences of service providers. For instance, a service provider may provide one or more work products that are marked as private, and those work products may not be publicly displayed. In addition, a service provider may mark a portion of a work product as private, and only the non-private portion may be publicly displayed. Such examples allow service provider work products to be included in knowledgebase 2100 for only some, but not necessarily all, possible uses. For instance, work products may be marked as private so that they are not publicly displayed, but may still be included in knowledgebase 2100 for purposes of matching and use during work sessions of service providers.

In one example, the method includes one or more program 10 subjecting to public display on a system 1000, work products of knowledgebase 2100 in a manner that the public display can be indexed by a search engine so that traffic to system 1000 is increased.

For example, work product can be publicly displaying on a services marketplace system 1000 located on the internet through an accessible web page. In such a case, appropriate metadata of the web pages may be set to enable indexing by search engines such as GOOGLE, available from Google, Inc., of Mountain View, California. For instance, if an internet user searches for terms related to the publicly displayed work product, search results can then lead to the work products.

In this example, if the material is properly explained to the consumer, there is a likelihood that the consumer will go on to actually order a service from services marketplace.

In another example, service providers may be searching and be directed to the services marketplace. In such a case, some of the service providers can register with system 1000 and upload work products using user interface 210. It is in this way that a services marketplace with a knowledgebase 2100 can serve to draw in system participants in a way that a services marketplace without any work products will not.

Note that: In this example, a service provider may optionally mark some work products as private using user interface 210, and such work products would not be publicly displayed.

In one example, work products of service providers can be used as part of a search engine optimization (SEO) strategy for a services marketplace on system 1000. In such a case, work products can be made publicly available, so that when they are indexed by search engines, users of the search engine who enter in terms similar to the work products will be directed to the services marketplace on system 1000 as one or more of the top search results.

In one example, in the translation field, a services marketplace on system 1000 can make publicly available source sentences and corresponding translated sentences. In such a case, a user of a search engine looking for a translation of the words of the sentences can find the services marketplace on system 1000. Once at the services marketplace, the user can be offered the ability to browse or view numerous service providers that can be capable of performing work for the user.

In another example, in the computer programming field, a services marketplace on system 1000 can make publicly available names and input parameters of functions and source code to implement such functions. In such a case, a user of a search engine looking for source code to implement a function can find the services marketplace on system 1000. Once at the services marketplace, the user can be offered to engage service providers.

In a further example, in the field of legal documents, a services marketplace on system 1000 can make publicly available different types of legal documents and appropriate language for appropriate jurisdictions. In such a case, a user of a search engine looking for a specific type of legal document for a specific legal need can find the services marketplace on system 1000. Once at the services marketplace, the user can be offered to engage legal service providers.

In an embodiment, one or more program 10 can output a message to the service consumer based on a result of the processing of the knowledgebase 2100. For instance, a service consumer may be searching for a service provider. One or more program 10 can output a message to the service consumer to draw in the service consumer to the services mediated by knowledgebase 2100. In such a case, the techniques disclosed herein allow knowledgebase 2100 to be leveraged to generate business for service providers. In addition, one or more program 10 for performance of block 414 can perform matching by processing a message from the service consumer responsive to the message to the service consumer.

By way of contrast, "feedback" and "reputation" systems have in many cases been put in place to ameliorate the problem of finding high quality service providers, but suffer from the fundamental reliance on self-descriptions. In feedback or reputation systems, in order for a match to occur, both service providers and service consumers must succeed in describing a particular service in identical terms or by selecting the same term from a preset list. Feedback or reputation systems can limit the level of granularity with which matching may occur, and can put a non-trivial burden on both service providers and consumers in the matching process. In one embodiment, system 1000 can include "feedback" and "reputation" systems. In one embodiment, system 1000 can be absent of "feedback" and "reputation" systems.

Further, in contrast with the techniques described herein, feedback or reputation systems can have the problems of high cost, limited repeatability, extended delivery times and the relatively high potential for error in services trade. For example, feedback and reputation systems do not have any particular provisions to enable collaboration, despite the potential benefits thereof.

Advantageously, the techniques described herein can be used to provide a web-based service exchange platform—or a "service enablement system"—that facilitates the efficient, precise and reliable matching of service providers with consumers, with a reduced upfront burden on system participants. In addition, the techniques described herein provide means for service providers to work faster, with higher quality, more repeatable, and at a lower cost to the consumer, providing a significant added benefit.

By way of example, the techniques described herein can be deployed in systems of the following types, with benefits as noted:

- Service exchanges or marketplaces, with databases of thousands or even millions of freelance or corporate service providers. The techniques described herein, such as matching, can be used to streamline the process of finding reliable service providers with particular areas of expertise.
- Service procurement platforms, including crowd sourcing platforms and the like (for facilitating service trade in specific domains), enabling ordering of services, at lower costs, without necessarily having to engage in the time-consuming process of finding and screening service providers, using the techniques described herein, such as the matching
- Self-service systems with reduced costs and turnaround times for some basic services (for example, the drafting of common legal documents) can he enabled using the techniques described herein, including the knowledgebase.
- Automated systems, available in certain service fields (such as translation); allowing for dramatically reduced costs and turnaround times for some types of service work by the techniques described herein, such as the work sessions.

In one embodiment, referring to the flow diagram of FIGS. 2 and 5, one or more program 10 can perform functional blocks 406, 410, 414, 418, 422 in any order and one or more program 10 can delete any number of functional blocks 406, 410, 414, 418, 422 in performance of methods herein.

There is set forth herein in one embodiment, in accordance with one or more program 10, performing processing of a knowledgebase 2100 having one or more work product of one or more service provider; and outputting a message to a first service provider during a work session of the first service provider based on a result of the performing processing of the knowledgebase, wherein the method includes restricting the one or more of the performing processing or the outputting a message unless required content of the first service provider has been obtained.

In one embodiment, the required content can be work product content. For example the required content can be one or more work product that is presented for obtaining by a service provider using a user interface 210 such as user interface 210 illustrated in FIG. 2. A work product can be a work product in a formatted file format. A required content can be a message indicating an agreed payment in another example. A required content can be work product content of a threshold size in one embodiment.

Figure 7:
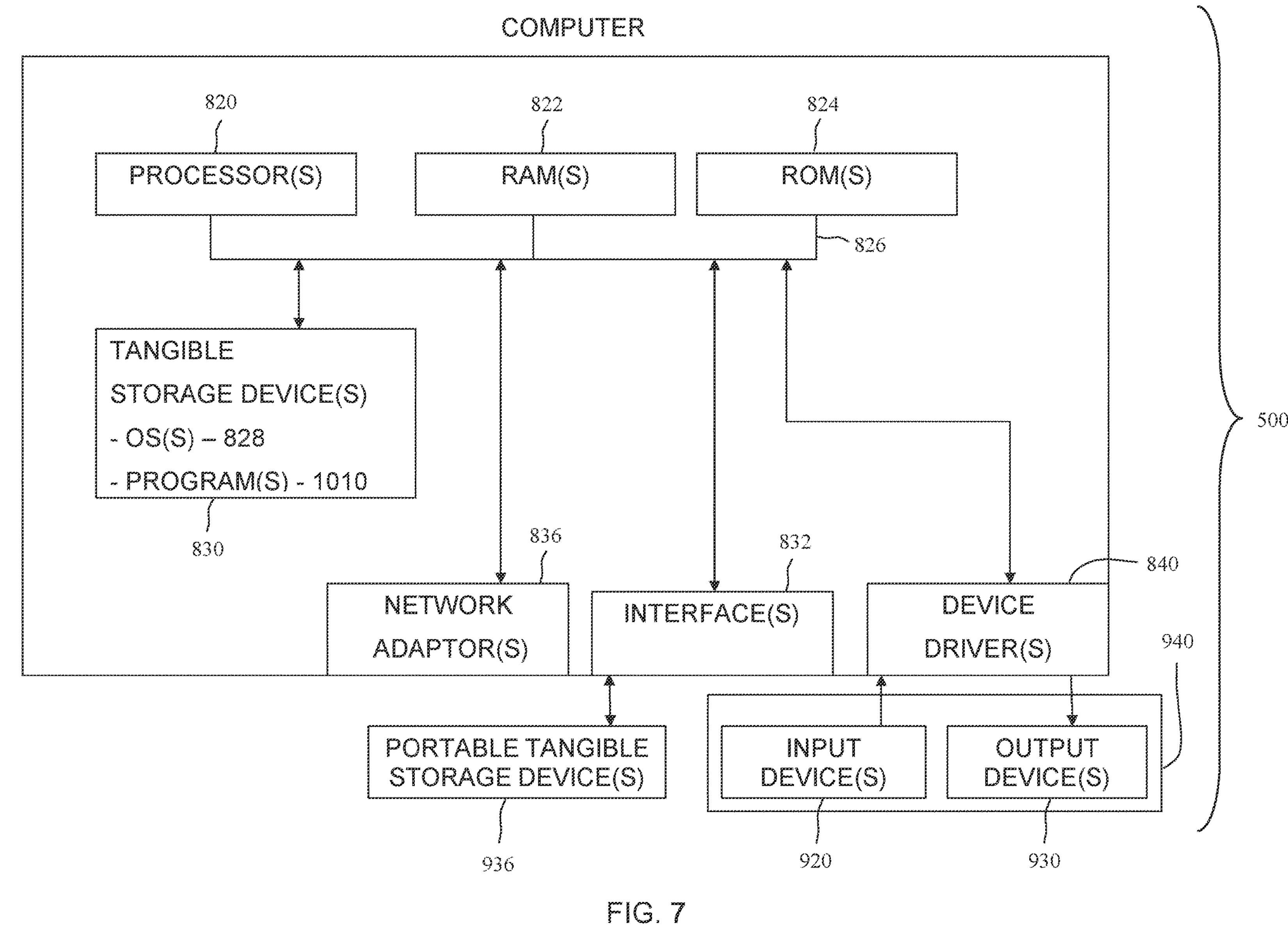
FIG. 7 is a hardware overview of a computer according to an illustrative embodiment of the disclosure.

FIG. 7 illustrates hardware and software components of an exemplary computer 500. In one embodiment one or more computer of server system 100 and client computers 200 can be provided in accordance with computer 500 as shown in FIG. 7.

Computer 500 can include one or more processor 820, one or more computer-readable RAM 822 and one or more computer-readable ROM 824 connected on one or more buses 826, and one or more operating system 828 and one or more computer-readable tangible storage device 830. The one or more operating system 828 and one or more program 10 can be stored on one or more of the computer-readable tangible storage device 830 for execution by the one or more processor 820 via one or more of the one or more RAM 822 (which typically include cache memory). One or more program 1010 can include one or more program 10 as set forth herein.

In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

In one embodiment one or more processor 110 of server system 100 as set forth in FIG. 1 is provided by one or more processor 820 as set forth in FIG. 7. In one embodiment one or more memory 120 as set forth in FIG. 1. is provided by the combination of the one or more RAMs 822 and the one or more ROMs 824 as set forth in the embodiment of FIG. 7 In one embodiment, the one or more computer readable tangible storage device 130 is provided by the one or more computer readable tangible storage device 830 as set forth in the embodiment of FIG. 7.

Computer 500 can also include interface 832 to read from and write to one or more portable computer-readable tangible storage devices 936 such as a CD-ROM, DVD, memory stick, magnetic tape, magnetic disk, optical disk or semiconductor storage device. In one embodiment, one or more program 10 as set forth herein can be stored on one or more of the portable computer-readable tangible storage devices 936, read via interface 832 and loaded into hard drive 830.

Computer 500 can also include a network adapter or interface 836 such as a TCP/IP adapter card. In one embodiment, one or more program 10 can be downloaded to computer 500 from an external computer via a network (for example, the Internet, a local area network or other, wide area network) and network adapter or interface 836. The external computer can include one or more tangible storage device 830 that stores the one or more program 10. From the network adapter or interface 836, the one or more program 10 can be loaded into hard drive 830. The network may comprise copper wires, optical fibers, wireless transmission, routers, firewalls, switches, gateway computers and/or edge servers.

Computer 500 can also include one or more input device 920 and one or more output device 930. One or more input device 920 and one or more output device 930 can define a user interface 940. In one example one or more input device 920 and one or more output device 930 can be provided by a touch screen having a touch screen overlay and a touch screen display. One or more input device 920 can include, e.g., a touch screen overlay, a keyboard, a pointer controller, an audio input device. One or more output device 930 can include, e.g. a visual output device, e.g. a display and/or a projector, an audio output device, a tactile output device. User interface 210 as set forth in FIG. 1 can be provided in accordance with user interface 940. Computer 500 can include one or more device driver 840 interfaced to one or more input device 920 and one or more output device 930. The one or more device driver 840, interface 832 and network adapter or interface 836 comprise hardware and software (stored e.g. in storage device 830 and/or ROM 824).

The one or more program 10 can be written in various programming languages including low-level, high-level, object-oriented or non object-oriented languages. The one or more program 10 in one embodiment includes a single program and in another embodiment includes a plurality of programs. In one embodiment, the one or more program 10 includes a plurality of programs wherein each of the functional blocks of flow diagrams set forth herein such as blocks 406, 410, 414, 418, 422 is provided by a different program. In one embodiment, the one or more program 10 includes a program where each of the functional blocks 406, 410, 414, 418, 422 is provided by different routine of a single program. The functions of one or more program 10 can be implemented in whole or in part by computer circuits and other hardware (not shown).

A small sample of apparatuses, systems and methods set forth herein include the following:

A1. A method comprising:

obtaining in a knowledgebase one or more work product of a certain service provider; subjecting to processing the one or more work product; and performing matching between the certain service provider and a service consumer based on a result of the subjecting to processing.

A2. The method of A1, wherein the one or more work product is in a form of a standard in trade product of work in the service field of the service provider.

A3. The method of A1, wherein the obtaining includes obtaining a work product provided in formatted file that is in a form of a standard in trade product of work in the service field of the service provider.

A4. The method of A1, wherein the obtaining includes obtaining a work product provided in a form of a standard in trade product of work in the service field of the service provider, wherein the subjecting to processing includes processing the one or more work product using text processing of the one or more work product and wherein the matching includes obtaining text based content of the service consumer and examining the text based content using text processing.

A5. The method of A1, wherein the obtaining includes obtaining a work product in a form of a standard in trade product of work in the service field of the service provider, wherein the subjecting to processing includes processing the one or more work product using text to subject matter processing to determine a subject matter of the one or more work product and wherein the matching includes obtaining text based content of the service consumer and examining the source document using text to subject matter processing to determine a subject matter of the text based content.

A6. The method of A1, wherein the obtaining includes obtaining a work product in a form of a standard in trade product of work in the service field of the service provider, wherein the subjecting to processing includes processing the one or more work product using term frequency processing of the one or more work product and wherein the matching includes obtaining text based content of the service consumer and examining the text based content using term frequency processing to determine a frequency of terms of the source document.

A7. The method of A1, wherein the method includes performing processing of the knowledgebase, and wherein the method includes outputting a message to a first service provider during a work session of the first service provider based on a result of the performing processing of the knowledgebase.

A8. The method of A1, wherein the one or more work product is a language translation and wherein the certain service provider is a language translator.

A9. The method of A1, wherein the subjecting to processing includes processing of the one or more work product for scoring the service provider.

A10. The method of A10, wherein the scoring includes determining a count of work products of the service provider.

A1 1. The method of A10, wherein the scoring includes determining a size of work product content of the service provider.

A12. The method of A1, further comprising including in the knowledgebase work products of service providers other than the certain service provider.

A13. The method of A1, wherein the subjecting to processing includes using text to subject matter processing.

A14. The method of A1, wherein the subjecting to processing includes using term frequency processing.

A15. The method of A1, further comprising outputting a message to the service provider during a work session of the certain service provider based on a result of a performing processing of the knowledgebase.

A16. The method of A1, wherein the obtaining includes using a user interface that prompts the certain service provider to provide the one or more work product.

B1. A method comprising:

obtaining in a knowledgebase one or more work product of a certain service provider, the knowledgebase having work products of service providers other than the certain service provider;

subjecting to processing the one or more work product;

performing matching between the certain service provider and a service consumer based on a result of the subjecting to processing;

performing processing of the knowledgebase having work products of service providers other than the certain service provider; and outputting a message to a first service provider during a work session of the first service provider based on a result of the performing processing of the knowledgebase.

B2. The method of B1, comprising updating the knowledgebase with a work product of the service provider completed during the work session.

B3. The method of B1, wherein the one or more work product of a certain service provider includes a batch work product and a controlled work session work product and wherein the subjecting to processing the one or more work product of the certain service provider includes processing the one or more work product for scoring the certain service provider by applying a different algorithm to grade the one or more work product based on whether the work product is a batch work product or a controlled work session work product.

B4. The method of B1, wherein the first service provider is the certain service provider.

B5. The method of B1, wherein the first service provider is a service provider other than the certain service provider.

B6. The method of B1, wherein the performing processing includes using a processing wherein processing quality increases with an increase in size of work product content.

B7. The method of B1, wherein the message includes a visual component.

B8. The method of B1, wherein the message includes an audio component.

B9. The method of B1, wherein the method includes using a website, and wherein the method includes subjecting to public display on the website a work product of the knowledgebase in a manner that the public display can be located by a search engine so that traffic to the website is increased.

B10. The method of B1, wherein the obtaining includes obtaining a work product provided in a form of a standard in trade product of work in the service field of the service provider, wherein the subjecting to processing includes processing the one or more work product using text to subject matter processing to determine a subject matter of the one or more work product and wherein the matching includes obtaining a source document of the service consumer and examining the source document using text to subject matter processing to determine a subject matter of the source document, wherein the performing processing includes using a processing having processing quality that increases with an increase in a size of work product content.

B11. The method of B1, wherein the obtaining includes obtaining a work product in a form of a standard in trade product of work in the service field of the service provider, wherein the subjecting to processing includes processing the one or more work product using term frequency processing to determine a subject matter of the one or more work product and wherein the matching includes obtaining a source document of the service consumer and examining the source document using term frequency processing to determine frequency of terms of the source document, wherein the performing processing includes using a processing having processing quality that increases with an increase in a size of work product content.

B12. The method of B1, wherein the obtaining includes obtaining a work product in a form of a standard in trade product of work in the service field of the service provider, wherein the subjecting to processing includes processing the one or more work product using text processing and wherein the matching includes obtaining a source document of the service consumer and examining the source document using text processing, wherein the performing processing includes using a processing having processing quality that increases with an increase in a size of work product content.

B13. The method of B1, wherein the obtaining includes obtaining a work product provided in a form of a standard in trade product of work in the service field of the service provider, wherein the subjecting to processing includes processing the one or more work product using text processing and wherein the matching includes obtaining a source document of the service consumer and examining the source document using text processing, wherein the performing processing includes using a processing having processing quality that increases with an increase in a size of work product content, and wherein the method includes using a website, and wherein the method includes subjecting to public display on the website a work product of the knowledgebase in a manner that the public display can be located by a search engine so that traffic to the website is increased.

B14. The method of B1, wherein the method includes obtaining the one or more work product and supporting the work session using web pages of a common website.

C1. A method comprising:

performing processing of a knowledgebase having one or more work product of one or more service provider; and outputting a message to a first service provider during a work session of the first service provider based on a result of the performing processing of the knowledgebase, wherein the method includes restricting the one or more of the performing processing or the outputting a message unless required content of the first service provider has been obtained.

C2. The method of claim C1, wherein the required content is work product content.

D1. A method comprising:

one or more processor obtaining in a knowledgebase one or more work product of a certain service provider;

one or more processor subjecting to processing the one or more work product; and one or more processor performing matching between the certain service provider and a service consumer based on a result of the subjecting to processing.

E1. A computer program product, the computer program product comprising: one or ore computer-readable, tangible storage device;

program instructions, stored on at least one of the one or more storage device for one or more processor to obtain in a knowledgebase one or more work product of a certain service provider;

program instructions, stored on at least one of the one or more storage device for one or more processor to subject to processing the one or more work product; and program instructions, stored on at least one of the one or more storage device for one or more processor to perform matching between the certain service provider and a service consumer based on a result of the subjecting to processing.

F1. A computer system, the computer system comprising:

one or more processor, one or more computer-readable memory and one or more computer-readable, tangible storage device;

program instructions, stored on at least one of the one or more storage device for execution by at least one of the one or more processor via at least one of the one or more computer readable memory to obtain in a knowledgebase one or more work product of a certain service provider;

program instructions, stored on at least one of the one or more storage device for execution by at least one of the one or more processor via at least one of the one or more computer readable memory to subject to processing the one or more work product; and program instructions, stored on at least one of the one or more storage device for execution by at least one of the one or more processor via at least one of the one or more computer readable memory to perform matching between the certain service provider and a service consumer based on a result of the subjecting to processing.

G1. A method comprising:

one or more processor obtaining in a knowledgebase one or more work product of a certain service provider, the knowledgebase having work products of service providers other than the certain service provider;

one or more processor subjecting to processing the one or more work product;

one or more processor performing matching between the certain service provider and a service consumer based on a result of the subjecting to processing;

one or more processor performing processing of the knowledgebase having work products of service providers other than the certain service provider; and one or more processor outputting a message to a first service provider during a work session of the first service provider based on a result of the performing processing of the knowledgebase.

H1. A computer program product, the computer program product comprising: one or more computer-readable, tangible storage device;

program instructions, stored on at least one of the one or more storage device for one or more processor to obtain in a knowledgebase one or more work product of a certain service provider, the knowledgebase having work products of service providers other than the certain service provider;

program instructions, stored on at least one of the one or more storage device for one or more processor to subject to processing the one or more work product;

program instructions, stored on at least one of the one or more storage device for one or more processor to perform matching between the certain service provider and a service consumer based on a result of the subjecting to processing;

program instructions, stored on at least one of the one or more storage device for one or more processor to perform processing of the knowledgebase having work products of service providers other than the certain service provider; and program instructions, stored on at least one of the one or more storage device for one or more processor to output a message to a first service provider during a work session of the first service provider based on a result of the performing processing of the knowledgebase.

II. A computer system, the computer system comprising:

one or more processor, one or more computer-readable memory and one or more computer-readable, tangible storage device;

program instructions, stored on at least one of the one or more storage device for execution by at least one of the one or more processor via at least one of the one or more computer readable memory to obtain in a knowledgebase one or more work product of a certain service provider, the knowledgebase having work products of service providers other than the certain service provider;

program instructions, stored on at least one of the one or more storage device for execution by at least one of the one or more processor via at least one of the one or more computer readable memory to subject to processing the one or more work product;

program instructions, stored on at least one of the one or more storage device for execution by at least one of the one or more processor via at least one of the one or more computer readable memory to perform matching between the certain service provider and a service consumer based on a result of the subjecting to processing;

program instructions, stored on at least one of the one or more storage device for execution by at least one of the one or more processor via at least one of the one or more computer readable memory to perform processing of the knowledgebase having work products of service providers other than the certain service provider; and program instructions, stored on at least one of the one or more storage device for execution by at least one of the one or more processor via at least one of the one or more computer readable memory to output a message to a first service provider during a work session of the first service provider based on a result of the performing processing of the knowledgebase.

J1. A method comprising:

one or more processor performing processing of a knowledgebase having one or more work product of one or more service provider; and one or more processor outputting a message to a first service provider during a work session of the first service provider based on a result of the performing processing of the knowledgebase, wherein the method includes restricting the one or more of the performing processing or the outputting a message unless required content of the first service provider has been obtained.

K1. A computer program product, the computer program product comprising:

one or more computer-readable, tangible storage device;

program instructions, stored on at least one of the one or more storage device for one or more processor to perform processing of a knowledgebase having one or more work product of one or more service provider;

program instructions, stored on at least one of the one or more storage device for one or more processor to output a message to a first service provider during a work session of the first service provider based on a result of the performing processing of the knowledgebase, wherein the method includes restricting the one or more of the performing processing or the outputting a message unless required content of the first service provider has been obtained.

LL. A computer system, the computer system comprising:

one or more processor, one or more computer-readable memory and one or more computer-readable, tangible storage device;

program instructions, stored on at least one of the one or more storage device for execution by at least one of the one or more processor via at least one of the one or more computer readable memory to perform processing of a knowledgebase having one or more work product of one or more service provider;

program instructions, stored on at least one of the one or more storage device for execution by at least one of the one or more processor via at least one of the one or more computer readable memory to output a message to a first service provider during a work session of the first service provider based on a result of the performing processing of the knowledgebase, wherein the method includes restricting the one or more of the performing processing or the outputting a message unless required content of the first service provider has been obtained.

Additional aspects of apparatus systems and methods herein are set forth in Appendix A entitled Service Enablement System With Knowledgebase and Appendix B entitled Service Enablement System with Participant-Enhanced Knowledgebase, each of which forms part of the present disclosure. Appendix A and Appendix B are included in as part of U.S. Provisional App. No. 62/059,901 filed Oct. 4, 2014 which is incorporated herein by reference in its entirety.

Based on the foregoing, a computer system, method and program product having a knowledgebase with work products of service providers have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Similarly, the term "based on" herein means "based on at least" unless the context indicates otherwise and the term "responsive to" means "responsive to at least" unless the context indicates otherwise. Furthermore, a device or structure that is configured in a certain way is configured in at least that way, but may also be configured in ways that are not listed. In addition, an apparatus system or method described as having a certain number of elements can be practiced with less than or more than the certain number of elements. Furthermore, an apparatus system or method that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:

obtaining at least one current work item of a service consumer;

performing processing of the at least one current work item of the service consumer, wherein the performing processing of the at least one current work item of the service consumer includes text processing of text-based content, wherein the text processing of text-based content involves using one or more natural language processing technique for characterizing subject matter of the at least one current work item of the service consumer to output work item natural language processing result data resulting from the using one or more natural language processing technique for characterizing subject matter of the at least one current work item of the service consumer;

comparing the work item natural language processing result data resulting from the using one or more natural language processing technique for characterizing subject matter of the at least one current work item of the service consumer to work product natural language processing result data which has resulted from subjecting to natural language processing one or more work product of respective ones of one or more service provider; and matching the service consumer to a certain service provider of the one or more service provider in response to the comparing the work item natural language processing result data to work product natural language processing result data which has resulted from subjecting to natural language processing one or more work product of respective ones of one or more service provider, wherein the method includes presenting to the certain service provider a user interface configured to enable file uploading by the certain service provider, receiving, through the user interface, a work product file defining an uploaded work product file of the certain service provider, wherein the work product natural language processing result data, which has resulted from subjecting one or more work product of the respective ones of the one or more service provider to natural language processing includes service provider result data generated by subjecting received work product data of the uploaded work product file of the certain service provider to natural language processing.

2. The method of claim 1, furthere comprising:

prompting the certain service provider to upload a work product file via the user interface.

3. The method of claim 1, wherein the using the one or more natural language processing technique includes generating vector-based representations of the text-based content, wherein the generated vector-based representations are used to perform similarity comparisons to work product content of service providers.

4. The method of claim 1, wherein at least a portion of prior work products of the service providers comprise controlled work session work products generated during structured user interface interactions defined by a system interface, wherein the controlled work session work products include machine-readable descriptors submitted through structured input interfaces, the descriptors retaining contextual relationships within a document structure, and further comprising associating the controlled work session work products with detailed metadata including service execution context, translation domain, language pairs, and performance parameters to enhance precision of subject matter characterization and matching operations.

5. The method of claim 4, further comprising incorporating additional work products generated by matched service providers during controlled work sessions into a knowledgebase, wherein the additional work products are automatically classified using natural language processing techniques to extract contextual metadata and subject matter descriptors, and wherein the knowledgebase is dynamically updated to improve future matching operations by retraining subject matter characterization models and provider ranking models based on the classified work products.

6. The method of claim 1, wherein the matching the service consumer to a certain service provider of the one or more service provider includes matching the service consumer to the certain service provider, wherein the certain service provider is a service provider of language translation or language interpreting services.

7. The method of claim 6, wherein the method includes presenting to the certain service provider a user interface configured to enable file uploading by the certain service provider, receiving, through the user interface, a work product file defining an uploaded work product file of the certain service provider.

8. The method of claim 1, wherein the using of the one or more natural language processing technique for characterizing subject matter of the at least one current work item includes generating work item vector space representation data of the at least one current work item, wherein the work product natural language processing result data includes work product vector space representation data of the one or more work product, and wherein the comparing is in dependence on the work item vector space representation data and the work product vector space representation data.

9. The method of claim 1, wherein scoring a data contribution of the certain service provider is performed in dependence on a file size of work product data received from the certain service provider, and wherein the matching is performed in dependence on the scoring.

10. The method of claim 1, wherein the method includes performing scoring of an originality of the certain service provider, wherein the performing scoring includes producing machine generated text based content and comparing text based work product content received from the certain service provider to the machine generated text based content, and wherein the matching is performed in dependence on the performing scoring of the originality of the certain service provider.

11. A method comprising:

obtaining at least one current work item of a service consumer;

performing processing of the at least one current work item of the service consumer, wherein the performing processing of the at least one current work item of the service consumer includes text processing of text-based content, wherein the text processing of text-based content involves using one or more natural language processing technique for characterizing subject matter of the at least one current work item of the service consumer to output work item natural language processing result data resulting from the using one or more natural language processing technique for characterizing subject matter of the at least one current work item of the service consumer;

comparing the work item natural language processing result data resulting from the using one or more natural language processing technique for characterizing subject matter of the at least one current work item of the service consumer to work product natural language processing result data which has resulted from subjecting to natural language processing one or more work product of respective ones of one or more service provider; and matching the service consumer to a certain service provider of the one or more service provider in response to the comparing the work item natural language processing result data to work product natural language processing result data which has resulted from subjecting to natural language processing one or more work product of respective ones of one or more service provider, wherein scoring a data contribution of the certain service provider is performed in dependence on a file size of work product data received from the certain service provider, and wherein the matching is performed in dependence on the scoring.

12. The method of claim 1 11, wherein the method includes presenting to the certain service provider a user interface configured to enable file uploading by the certain service provider, prompting the certain service provider to upload a work product file via the user interface, and receiving, through the user interface, a work product file defining an uploaded work product file of the certain service provider, wherein the work product natural language processing result data, which has resulted from subjecting one or more work product of the respective ones of the one or more service provider to natural language processing includes service provider result data generated by subjecting received work product data of the uploaded work product file of the certain service provider to natural language processing, wherein the using of the one or more natural language processing technique for characterizing subject matter of the at least one current work item includes generating work item vector space representation data of the at least one current work item, wherein the work product natural language processing result data includes work product vector space representation data of the uploaded work product file, and wherein the comparing is in dependence on the work item vector space representation data and the work product vector space representation data.

13. The method of claim 11, wherein the method includes presenting to the certain service provider a user interface configured to enable file uploading by the certain service provider, prompting the certain service provider to upload a work product file via the user interface, and receiving, through the user interface, a work product file defining an uploaded work product file of the certain service provider, wherein the work product natural language processing result data, which has resulted from subjecting one or more work product of the respective ones of the one or more service provider to natural language processing includes service provider result data generated by subjecting received work product data of the uploaded work product file of the certain service provider to natural language processing, wherein the using of the one or more natural language processing technique for characterizing subject matter of the at least one current work item includes generating work item vector space representation data of the at least one current work item, wherein the work product natural language processing result data includes work product vector space representation data of the uploaded work product file, and wherein the comparing is in dependence on the work item vector space representation data and the work product vector space representation data, wherein the method includes performing scoring of an originality of the certain service provider, wherein the performing scoring includes producing machine generated text based content and comparing text based work product content of the uploaded work product file received from the certain service provider to the machine generated text based content, and wherein the matching is performed in dependence on the performing scoring of the originality of the certain service provider.

14. The method of claim 11, wherein the method includes presenting to the certain service provider a user interface configured to enable file uploading by the certain service provider, prompting the certain service provider to upload a work product file via the user interface, and receiving, through the user interface, a work product file defining an uploaded work product file of the certain service provider, wherein the work product natural language processing result data, which has resulted from subjecting one or more work product of the respective ones of the one or more service provider to natural language processing includes service provider result data generated by subjecting received work product data of the uploaded work product file of the certain service provider to natural language processing.

15. The method of claim 11, wherein the using of the one or more natural language processing technique for characterizing subject matter of the at least one current work item includes generating work item vector space representation data of the at least one current work item, wherein the work product natural language processing result data includes work product vector space representation data of the one or more work product, and wherein the comparing is in dependence on the work item vector space representation data and the work product vector space representation data.

16. The method of claim 11, wherein the matching the service consumer to a certain service provider of the one or more service provider includes matching the service consumer to the certain service provider, wherein the certain service provider is a service provider of language translation or language interpreting services.

17. A method comprising:

obtaining at least one current work item of a service consumer;

performing processing of the at least one current work item of the service consumer, wherein the performing processing of the at least one current work item of the service consumer includes text processing of text-based content, wherein the text processing of text-based content involves using one or more natural language processing technique for characterizing subject matter of the at least one current work item of the service consumer to output work item natural language processing result data resulting from the using one or more natural language processing technique for characterizing subject matter of the at least one current work item of the service consumer;

comparing the work item natural language processing result data resulting from the using one or more natural language processing technique for characterizing subject matter of the at least one current work item of the service consumer to work product natural language processing result data which has resulted from subjecting to natural language processing one or more work product of respective ones of one or more service provider; and matching the service consumer to a certain service provider of the one or more service provider in response to the comparing the work item natural language processing result data to work product natural language processing result data which has resulted from subjecting to natural language processing one or more work product of respective ones of one or more service provider, wherein the method includes performing scoring of an originality of the certain service provider, wherein the performing scoring includes producing machine generated text based content and comparing text based work product content received from the certain service provider to the machine generated text based content, and wherein the matching is performed in dependence on the performing scoring of the originality of the certain service provider.

18. The method of claim 17, wherein the method includes presenting to the certain service provider a user interface configured to enable file uploading by the certain service provider, prompting the certain service provider to upload a work product file via the user interface, and receiving, through the user interface, a work product file defining an uploaded work product file of the certain service provider, wherein the work product natural language processing result data, which has resulted from subjecting one or more work product of the respective ones of the one or more service provider to natural language processing includes service provider result data generated by subjecting received work product data of the uploaded work product file of the certain service provider to natural language processing.

19. The method of claim 17, wherein the using of the one or more natural language processing technique for characterizing subject matter of the at least one current work item includes generating work item vector space representation data of the at least one current work item, wherein the work product natural language processing result data includes work product vector space representation data of the one or more work product, and wherein the comparing is in dependence on the work item vector space representation data and the work product vector space representation data.

20. The method of claim 17, wherein the matching the service consumer to a certain service provider of the one or more service provider includes matching the service consumer to the certain service provider, wherein the certain service provider is a service provider of language translation or language interpreting services.

* * * * *